United States Patent
Abe et al.

(10) Patent No.: US 11,066,206 B2
(45) Date of Patent: Jul. 20, 2021

(54) PACKAGE, AND METHODS FOR PRODUCING AND FOR USING SELF-ADHESIVE

(71) Applicant: ZEON CORPORATION, Tokyo (JP)

(72) Inventors: Mitsunori Abe, Tokyo (JP); Atsushi Sone, Tokyo (JP)

(73) Assignee: ZEON CORPORATION, Tokyo (JP)

(*) Notice: Subject to any disclaimer, the term of this patent is extended or adjusted under 35 U.S.C. 154(b) by 0 days.

(21) Appl. No.: 16/438,739

(22) Filed: Jun. 12, 2019

(65) Prior Publication Data

US 2019/0291915 A1   Sep. 26, 2019

Related U.S. Application Data

(62) Division of application No. 15/574,845, filed as application No. PCT/JP2016/063493 on Apr. 28, 2016, now abandoned.

(30) Foreign Application Priority Data

Jun. 8, 2015   (JP) .................................. 2015-115999

(51) Int. Cl.
    *B65D 5/02*        (2006.01)
    *C08J 9/30*        (2006.01)
    (Continued)

(52) U.S. Cl.
    CPC .............. *B65D 5/0227* (2013.01); *B65D 5/66* (2013.01); *B65D 5/6602* (2013.01); *B65D 33/18* (2013.01);
    (Continued)

(58) Field of Classification Search
    CPC .... B65D 5/6602; B65D 5/0227; B65D 33/18; B65D 33/20; B65D 27/16; B65D 77/2096;
    (Continued)

(56) References Cited

U.S. PATENT DOCUMENTS 3,680,767 A   8/1972   De Lorenzo et al.
4,271,964 A   6/1981   Train
(Continued)

FOREIGN PATENT DOCUMENTS

CN   102259726 A   11/2011
CN   102443357 A   5/2012
(Continued)

OTHER PUBLICATIONS

Dec. 12, 2017, International Preliminary Report on Patentability issued in the International Patent Application No. PCT/JP2016/063493.

(Continued)

*Primary Examiner* — Christopher R Demeree
(74) *Attorney, Agent, or Firm* — Kenja IP Law PC

(57) ABSTRACT

Provided is a method for producing a self-adhesive to be arranged on a package comprising a space to store contents and an opening by which the space and an outside communicate, wherein the opening is repeatedly openable and sealable by the self-adhesive that consists of a cross-linking material of a resin composition containing a (meth)acrylic acid ester copolymer resin having a glass transition temperature of −22.8° C. or more, and a crosslinking agent. The method comprises making the resin composition that contains the (meth)acrylic acid ester copolymer resin, and the crosslinking agent, the resin composition being either emulsion or dispersion; and cross-linking the resin composition.

10 Claims, 9 Drawing Sheets

(51) Int. Cl.
*B65D 5/66* (2006.01)
*B65D 33/20* (2006.01)
*B65D 85/10* (2006.01)
*C09J 7/30* (2018.01)
*B65D 33/18* (2006.01)
*C09J 133/08* (2006.01)

(52) U.S. Cl.
CPC ............ *B65D 33/20* (2013.01); *B65D 85/10* (2013.01); *C08J 9/30* (2013.01); *C09J 7/30* (2018.01); *C09J 133/08* (2013.01); *C08J 2207/02* (2013.01); *C08J 2333/08* (2013.01); *C09J 2433/00* (2013.01)

(58) Field of Classification Search
CPC ..... C09J 7/30; C09J 9/30; C09J 133/08; C09J 2433/00; C09J 7/385; C09J 153/00; C09J 2301/302; B29C 65/4855; B29C 65/76; B29C 66/73121; B32B 7/12; B32B 2270/00; B32B 27/306; B05D 3/067
USPC ..... 229/245, 160.1; 156/524, 533, 547, 327; 428/355 R, 327, 355 AC, 431; 493/128; 206/813; 427/208.4
See application file for complete search history.

(56) References Cited

U.S. PATENT DOCUMENTS

| | | | |
|---|---|---|---|
| 4,948,038 A | 8/1990 | Moeller | |
| 5,092,516 A | 3/1992 | Kastanek | |
| 5,678,690 A | 10/1997 | Belvederi et al. | |
| 7,537,113 B2 | 5/2009 | Tambo | |
| 8,389,596 B2 | 3/2013 | Boyce et al. | |
| 8,763,890 B2 | 7/2014 | Clark et al. | |
| 10,017,310 B2 | 7/2018 | Lyzenga et al. | |
| 2004/0198897 A1* | 10/2004 | Domine | C08L 91/06 524/560 |
| 2008/0151031 A1 | 6/2008 | Kobayashi | |
| 2011/0210163 A1* | 9/2011 | Clark | B32B 27/08 229/120.05 |
| 2011/0211778 A1 | 9/2011 | Zerfas et al. | |
| 2014/0065404 A1* | 3/2014 | Higuchi | C09J 7/401 428/220 |
| 2014/0309346 A1* | 10/2014 | Schumann | C08K 5/54 524/114 |
| 2014/0316324 A1* | 10/2014 | Wibaux | C09J 7/385 602/56 |
| 2014/0342121 A1* | 11/2014 | Taguchi | G02B 1/105 428/141 |
| 2015/0131926 A1 | 5/2015 | Lux et al. | |
| 2018/0148214 A1 | 5/2018 | Abe et al. | |
| 2018/0291240 A1 | 10/2018 | Behling et al. | |
| 2018/0298240 A1* | 10/2018 | Chatterjee | C09J 7/385 |

FOREIGN PATENT DOCUMENTS

| | | |
|---|---|---|
| JP | S57105218 U1 | 6/1982 |
| JP | H08169485 A | 7/1996 |
| JP | 2006176693 A | 7/2006 |
| JP | 2007039607 A | 2/2007 |
| JP | 2008155987 A | 7/2008 |
| JP | 2008265839 A | 11/2008 |
| JP | 2010254961 A | 11/2010 |
| JP | 2013521195 A | 6/2013 |

OTHER PUBLICATIONS

Jul. 26, 2016, International Search Report issued in the International Patent Application No. PCT/JP2016/063493.

Jun. 28, 2018, Office Action issued by the United States Patent and Trademark Office in the U.S. Appl. No. 15/574,845.

Sep. 6, 2018, Office Action issued by the United States Patent and Trademark Office in the U.S. Appl. No. 15/574,845.

Mar. 12, 2019, Office Action issued by the United States Patent and Trademark Office in the U.S. Appl. No. 15/574,845.

Jan. 4, 2019, the Extended European Search Report issued by the European Patent Office in the corresponding European Patent Application No. 16807230.4.

Nov. 22, 2019, Communication pursuant to Article 94(3) EPC issued by the European Patent Office in the corresponding European Patent Application No. 16807230.4.

* cited by examiner

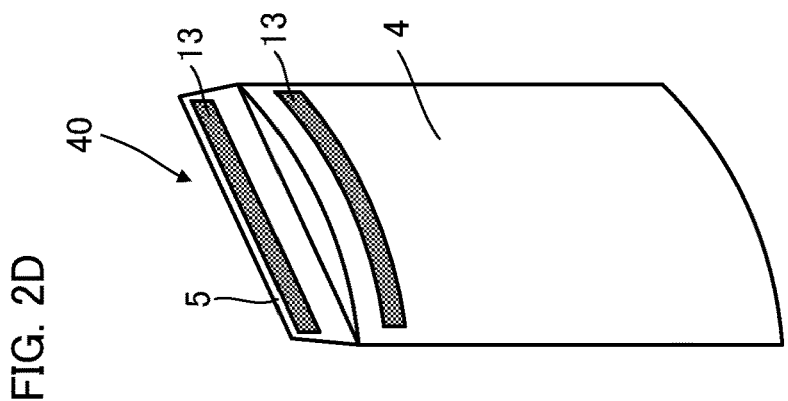
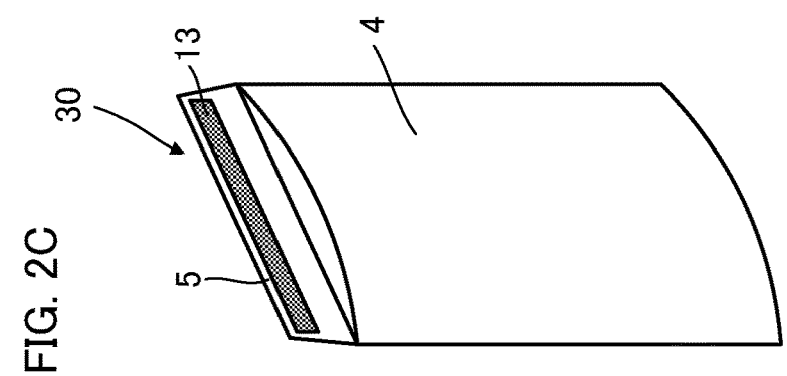
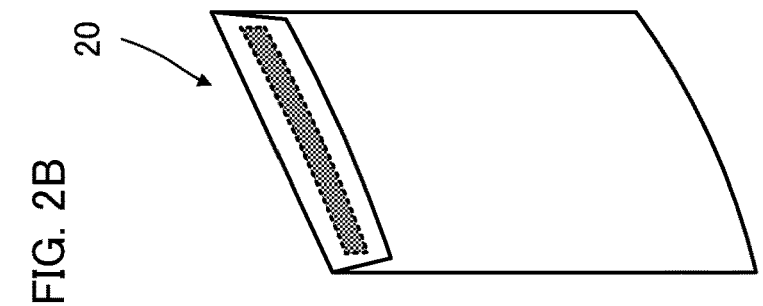
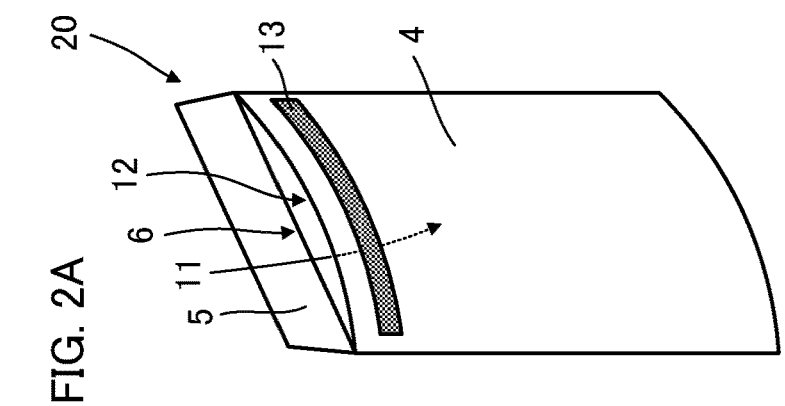

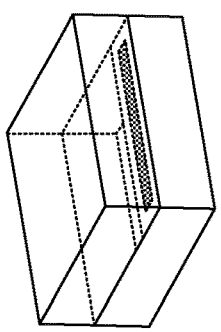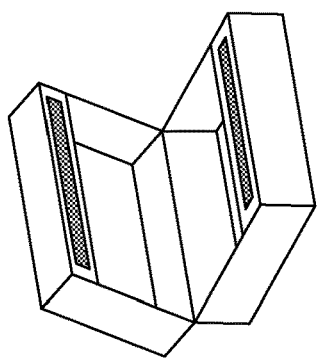
FIG. 7A — Front Adhesion
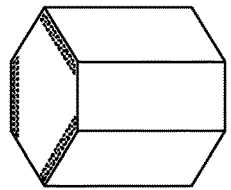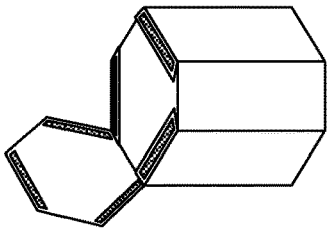
FIG. 7B — Top Adhesion 1
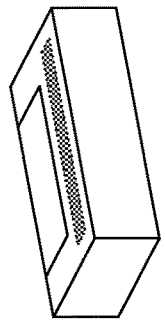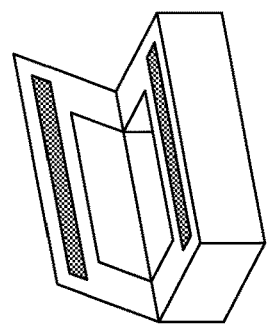
FIG. 7C — Top Adhesion 2
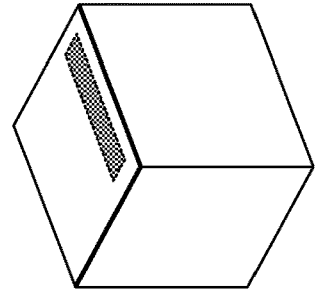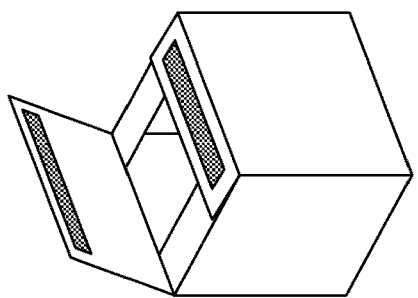
FIG. 7D — Hexagonal Box
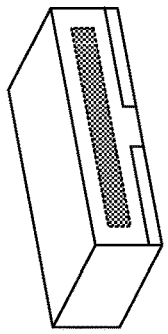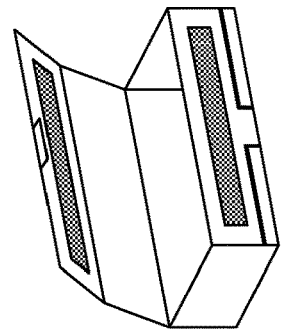
FIG. 7E — Double Boxes Joined

FIG. 8A
Sliding Box
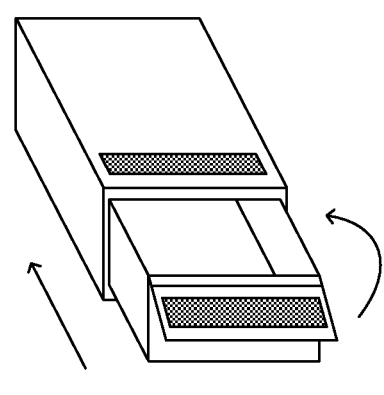
FIG. 8B
Sliding Box
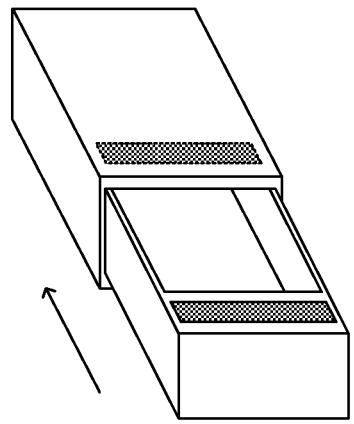
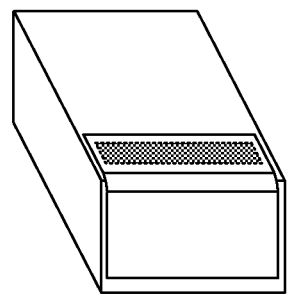
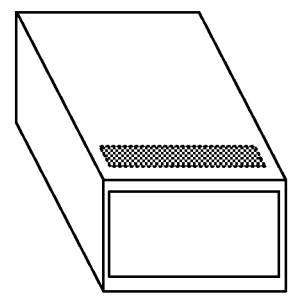

PACKAGE, AND METHODS FOR PRODUCING AND FOR USING SELF-ADHESIVE

CROSS-REFERENCE TO RELATED APPLICATION

This application is a divisional application of U.S. application Ser. No. 15/574,845 filed Nov. 17, 2017, which is a National Stage Application of PCT/JP2016/063493 filed Apr. 28, 2016, which claims priority based on Japanese Patent Application No. 2015-115999 filed Jun. 8, 2015. The disclosures of the prior applications are hereby incorporated by reference herein in their entirety.

TECHNICAL FIELD

The present invention relates to packages that are repeatedly sealable, and methods for producing and for using self-adhesives that are to be arranged in the packages.

BACKGROUND ART

Conventionally, cardboard boxes are used as packaging containers for sweets, etc. Such a box usually has a cup-shaped bottomed container having an opening, and a cup-shaped upper lid that is hinged to an upper edge portion (usually one side of the rectangular opening) of the bottomed container (hereinafter such a lid may be referred to as "hinged lid"). The box is openable and closable by rotating the hinged lid around the upper edge portion.

When sweets such as chocolate are put into a package having a hinged lid, usually, each predetermined number of sweets that came out of a producing machine is packaged and sealed up in a composite film of an aluminized resin film or the like, to be put into a box made of paper.

Various methods have been discussed as methods of sealing a package having a hinged lid. For example, Patent Literature 1 discloses a box defined by a cup-shaped container, a cup-shaped lid, and a collar that protrudes outward from an opening end of the cup-shaped container, wherein the cup-shaped lid has a front wall including an inside strengthened tab, part of the front wall is adhered to part of the collar, and the box is opened by breaking the part of the front wall or the part of the collar.

CITATION LIST

Patent Literature

Patent Literature 1: JP H08-169485A

SUMMARY OF INVENTION

Technical Problem

However, Patent Literature 1 relates to techniques of sealing a package having a hinged lid before opening the package. Opening the package is accompanied with breakage of a member. Thus, the package cannot be sealed again after opened.

In the above case of sweets as an example, airtightness of the package is damaged by opening the composite film inside the package, which leads to easy deterioration of the contents. Therefore, a package that can have airtightness again after opened first time is demanded.

An object of the present invention is to provide a package that is repeatedly sealable after the package is opened first time, and methods for producing and for using a self-adhesive that is used for the package.

Solution to Problem

That is, a first aspect of the present invention is a package comprising: a space to store contents; and an opening by which the space and an outside communicate, wherein the opening is repeatedly openable and sealable by a self-adhesive (E) that consists of a cross-linking material of a resin composition (C) containing a (meth)acrylic acid ester copolymer resin (A), and a crosslinking agent (B).

In this invention, "(meth)acrylic" means "acrylic and/or methacrylic".

"A cross-linking material of a resin composition (C)" means that an intramolecular or intermolecular crosslinked structure forms at least in (meth)acrylic acid ester copolymer in the resin composition (C).

The package according to the first aspect of the present invention may comprise: a package body that has the space to store the contents, the package body being formed with the opening; and a lid with which the opening of the package body can be covered, wherein each of the package body and the lid may have a contact portion where the package body and the lid are in contact with each other in a position of the package being closed, and the self-adhesive (E) may be arranged on at least part of the contact portion.

In the first aspect of the present invention, preferably, a glass transition temperature of the (meth)acrylic acid ester copolymer resin (A) is no more than $-10°$ C.

In the first aspect of the present invention, preferably, the (meth)acrylic acid ester copolymer resin (A) has a N-methylol group, and gel fraction of no more than 70%.

In the first aspect of the present invention, preferably, the resin composition (C) is a resin composition foam (D) that is foamed.

In the first aspect of the present invention, preferably, the resin composition (C) contains 0.1 to 20 parts by mass of a carbodiimide crosslinking agent (B1), to 100 parts by mass of the (meth)acrylic acid ester copolymer resin (A).

In the first aspect of the present invention, preferably, the package is made of paper.

A second aspect of the present invention is a method for producing the self-adhesive (E) to be arranged on the package according to the first aspect of the present invention, the method comprising: making the resin composition (C) that contains the (meth)acrylic acid ester copolymer resin (A), and the crosslinking agent (B); and cross-linking the resin composition (C); or a method for producing the self-adhesive (E) to be arranged on the package according to the first aspect of the present invention, the method comprising: making the resin composition (C) that contains the (meth)acrylic acid ester copolymer resin (A), and the crosslinking agent (B); foaming the resin composition (C), to make the resin composition foam (D); and cross-linking the resin composition foam (D).

In the second aspect of the present invention, preferably, said cross-linking is carried out on a surface of the package.

A third aspect of the present invention is a method for using a self-adhesive (E) for adhesion in a package in order to seal an opening, the package comprising: a space to store contents; and the opening by which the space and an outside communicate, the opening being repeatedly openable and sealable.

In the third aspect of the present invention, the package may comprise: a package body that has the space to store the contents, the package body being formed with the opening; and a lid with which the opening of the package body can be covered, and the adhesion may be at a contact portion of the package body and the lid.

In the third aspect of the present invention, preferably, the self-adhesive (E) is a foam.

Advantageous Effects of Invention

According to the present invention, provided can be a package that is repeatedly sealable after the package is opened first time, and methods for producing and for using a self-adhesive that is used for the package.

BRIEF DESCRIPTION OF DRAWINGS

FIGS. 2A, 2C and 2D are perspective views showing positions of packages 20, 30 and 40 being opened respectively, and FIG. 2B is a perspective view showing a position of the package 20 being closed.

FIGS. 7A to 7E are perspective views showing positions of packages according to other embodiments of the present invention being opened and closed.

FIGS. 8A and 8B are perspective views showing positions of packages according to further other embodiments of the present invention being opened and closed.

DESCRIPTION OF EMBODIMENTS

Figure 1A:
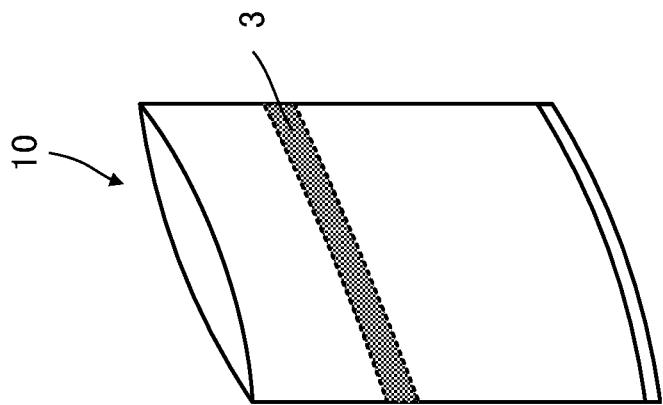
FIG. 1A is a perspective view showing a position of a package 10 being opened.

Hereinafter, the embodiments of the present invention will be described. The embodiments described below are examples of the present invention, and the present invention is not limited thereto. In the drawings, some members are omitted and/or transparent if necessary.

1. Package

A package of the present invention is a package comprising: a space to store contents; and an opening by which the space and an outside communicate, wherein the opening is repeatedly openable and sealable by a self-adhesive (E) that consists of a cross-linking material of a resin composition (C) containing a (meth)acrylic acid ester copolymer resin (A), and a crosslinking agent (B).

Hereinafter a package 10 according to one embodiment of the present invention will be described with reference to FIGS. 1A and 1B.

Figure 1B:
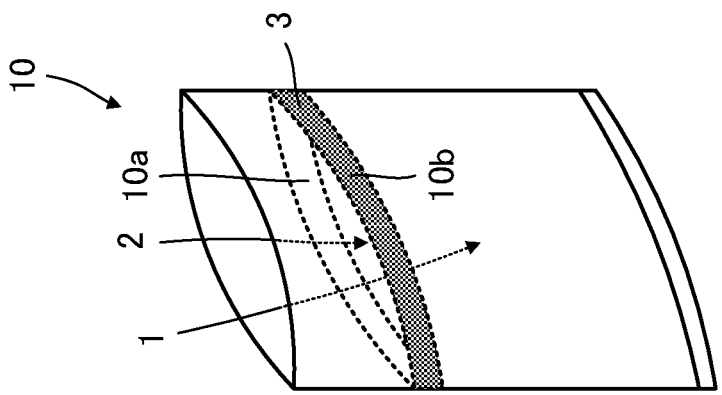
FIG. 1B is a perspective view showing a position of the package 10 being closed.

FIG. 1A is a perspective view showing a position of the package 10 being opened, and FIG. 1B is a perspective view showing a position of the package 10 being closed. The package 10 is a bottom seal bag. The package 10 includes a space 1 to store the contents, and an opening 2 by which the space 1 and the outside communicate. A self-adhesive (E) 3 is arranged over an inside face of at least one of portions 10a and 10b of the package 10 which face each other and which form the opening 2. The following are ways of adhesion of the self-adhesive (E): pasting using adhesion of sheet material itself, and adsorbing to an adherend due to sucking effect using microcavities that are formed in a sheet. The self-adhesive (E) can adhere to an adherend by one or both adhering way(s). The self-adhesive (E) is easy to be restuck without any remaining glue.

The package 10 can easily take the closed position shown in FIG. 1B by pressing the portions 10a and 10b from the outside of the package in the opened position shown in FIG. 1A. At this time, the package 10 is sealed by self-adhesion of the self-adhesive (E) 3 to an inside face of one of the portion 10a or 10b of the package which the self-adhesive (E) 3 faces when the self-adhesive (E) 3 is arranged over the inside face of the other of the portions 10a and 10b, or by self-adhesion of the self-adhesives (E) 3 to each other when the self-adhesives (E) 3 are arranged over the inside faces of both of the portions 10a and 10b of the package. Whereby, the airtightness can be improved again even after the package is opened. When the package 10 is opened again, a finger or the like is inserted into the package from the top edge of the package 10, and expands a space over the opening 2, thereby the self-adhesive (E) 3 is separated from the portion 10a or 10b, or the self-adhesives (E) 3 are separated from each other, and the package can be easily opened. When the package is opened, self-adhesion of the self-adhesive (E) 3 is not damaged. Thus, the package 10 can be repeatedly sealed and opened. The embodiment of self-adhesion of the self-adhesives (E) 3 to each other can be especially preferably employed when the package 10 is constituted by material to which the self-adhesive (E) 3 is hard to self-adhere.

Packages 20, 30 and 40 according to other embodiments of the present invention will be described with reference to FIGS. 2A to 2D. FIG. 2A shows a position of the package 20 being opened viewed from the same point as FIG. 1A. FIG. 2B shows a position of the package 20 being closed viewed from the same point as FIG. 1B. The package 20 is an envelope. The package 20 includes a space 11 to store the contents, a package body 4 that is formed with an opening 12, and a lid 5 with which the opening 12 of the package body 4 can be covered. The package body 4 and the lid 5 connect along an upper edge 6 of the package body 4. The lid 5 is a hinged lid. The opened (at least FIG. 2A) and closed (FIG. 2B) positions can be taken by the lid 5 rotating around the upper edge 6. As shown in FIG. 2B, each of the package body 4 and the lid 5 has a contact portion where they are in contact with each other in the position of the package 20 being closed. A self-adhesive (E) 13 is arranged on at least part of the contact portion.

The self-adhesive (E) 13 is adhered and fixed to the package body 4 in the package 20. When the package 20 is closed, the self-adhesive (E) 13 self-adheres to the back face of the lid 5, to seal the package 20. Whereby, it is possible to improve the airtightness again even after the package is opened. When the package 20 is opened again, for example, a nail or the like is hooked under the lower edge of the lid 5, thereby the self-adhesive (E) 13 is separated from the lid 5, and the package can be easily opened. When the package is opened, self-adhesion of the self-adhesive (E) 13 is not damaged. Thus, the package 20 can be repeatedly sealed and opened.

The package 30 will be described with reference to FIG. 2C. FIG. 2C shows a position of the package 30 being opened viewed from the same point as FIG. 2A. The self-adhesive (E) 13 is arranged over, and adhered and fixed to the back face of the lid 5 in the package 30. The structure other than this is same as the package 20. When the package 30 is closed, the self-adhesive (E) 13 self-adheres to the surface of the package body 4, to seal the package 30. Whereby, it is possible to improve the airtightness again even after the package is opened. When opened, the package 30 can be easily opened by the same way as the package 20. Thus, such an embodiment of the package 30 can be repeatedly sealed and opened as well.

The package 40 will be described with reference to FIG. 2D. FIG. 2D shows a position of the package 40 being opened viewed from the same point as FIG. 2A. The self-adhesive (E) 13 is arranged over, and adhered and fixed to each of the surface of the package body 4 and the back face of the lid 5 in the package 40. The structure other than this is same as the package 20. When the package 40 is closed, the self-adhesives (E) 13 self-adhere to each other, to seal the package 40. Whereby, it is possible to improve the airtightness again even after the package is opened. When opened, the package 40 can be easily opened by the same way as the package 20. Thus, such an embodiment of the package 40 can be repeatedly sealed and opened as well. The package 40 can be especially preferably employed when the package body 4 and the lid 5 are constituted by material that the self-adhesive (E) 13 is hard to self-adhere to because the self-adhesives (E) 13 self-adhere to each other.

A package 50 according to another embodiment of the present invention will be described with reference to FIGS. 3A and 3B.

Figure 3A:
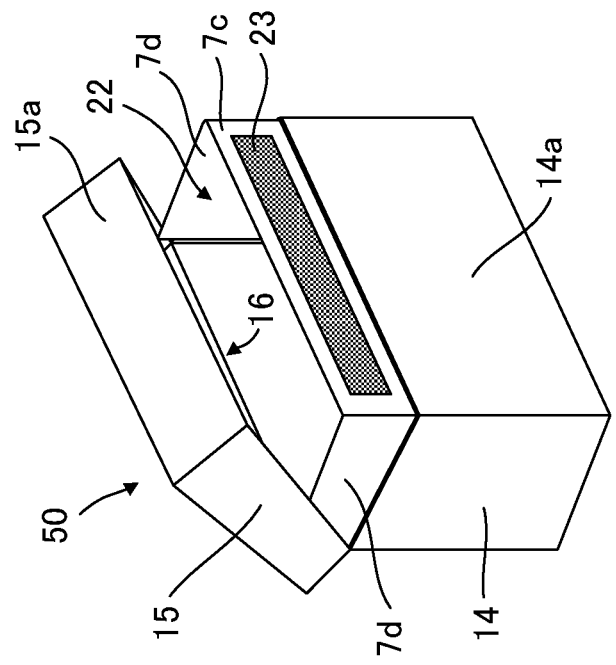
FIG. 3A is a perspective view showing a position of a package 50 being closed.
Figure 3B:
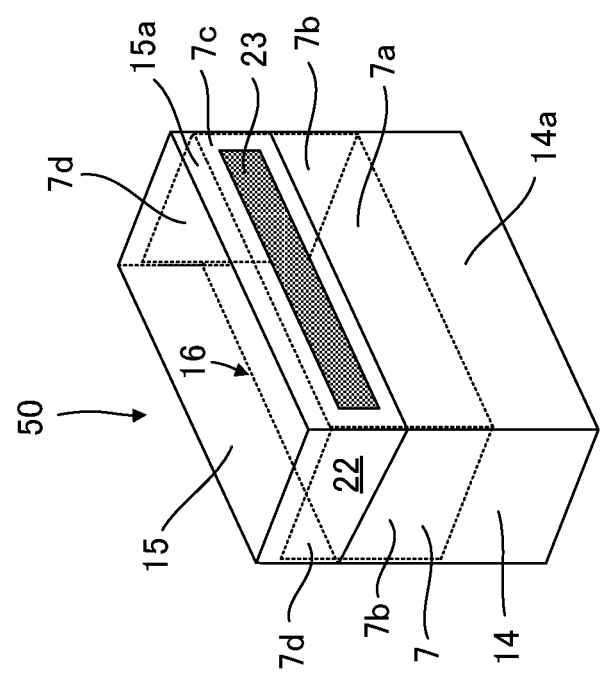
FIG. 3B is a perspective view showing a position of the package 50 being opened.

FIG. 3A is a perspective view in a position of the package 50 being closed, and FIG. 3B is a perspective view in a position of the package 50 being opened. The package 50 includes a box-shaped package body 14 that forms with an opening 22, and a lid 15 with which the opening 22 of the package body 14 is covered. The package body 14 and the lid 15 connect along an upper edge 16 of the package body 14. The lid 15 is a hinged lid. The closed (FIG. 3A) and opened (at least FIG. 3B) positions can be taken by the lid 15 rotating around the upper edge 16.

The package body 14 includes a collar 7 that partially adheres to an inner face of the container body 14, and partially protrudes outward from the opening 22 of the package body 14. As shown in FIG. 3A, the collar 7 includes: an inner front wall 7a, and inside walls 7b, 7b which adhere to the inner face of the package body 14; and an outer front wall 7c, and outside walls 7d, 7d which protrude outward from the opening 22 of the package body 14. In this embodiment, the package body 14 and the lid 15 are in contact with each other over the outside faces of the outer front wall 7c and outside walls 7d, 7d in the position of the package 50 being closed.

A self-adhesive (E) 23 is arranged over the outer front wall 7c among the outer front wall 7c and the outside walls 7d, 7d which are contact portions of the package body 14 and the lid 15 in the package 50.

The self-adhesive (E) 23 is adhered and fixed to the surface of the outer front wall 7c of the package 50. When the package 50 is closed, the self-adhesive (E) 23 self-adheres to the back face of a front wall 15a of the lid 15, to seal the package 50. Whereby, it is possible to improve the airtightness again even after the package is opened. When the package 50 is opened again, a nail or the like is hooked under the lower edge of the front wall 15a of the lid 15, or a front wall 14a of the package body 14 is pressed from the outside, thereby the self-adhesive (E) 23 is separated from the front wall 15a of the lid 15, and the package can be easily opened. When the package is opened, self-adhesion of the self-adhesive (E) 23 is not damaged. Thus, the package 50 can be repeatedly sealed and opened.

In view of improving airtightness of the package 50, the self-adhesive (E) 23 is preferably arranged all over the contact portions of the package body 14 and the lid 15 (that is, not only over the outer front wall 7c but also over the outside walls 7d, 7d). On the other hand, in view of easy opening, the self-adhesive (E) 23 is preferably arranged only over the outer front wall 7c. A position where the self-adhesive (E) is arranged among the contact portions of the package body and the lid can be suitably set according to airtightness and easy openability that are demanded from the package.

Figure 4A:
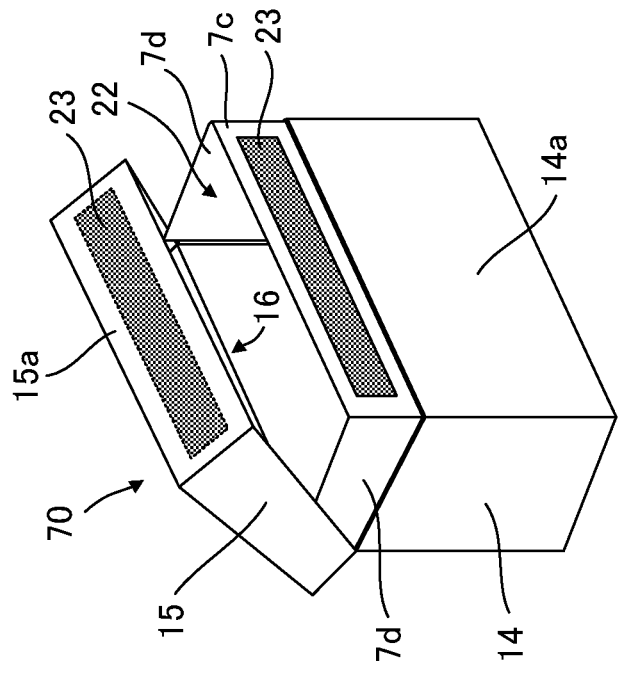
FIGS. 4A and 4B are perspective views showing positions of packages 60 and 70 being opened respectively.

A package 60 according to another embodiment of the present invention will be described with reference to FIG. 4A. FIG. 4A shows a position of the package 60 being opened viewed from the same point as FIG. 3B. The self-adhesive (E) 23 is arranged over, and adhered and fixed to the back face of the front wall 15a of the lid 15 in the package 60. The structure other than this is same as the package 50. When the package 60 is closed, the self-adhesive (E) 23 self-adheres to the surface of the outer front wall 7c of the package body 14, to seal the package 60. Whereby, it is possible to improve the airtightness again even after the package is opened. When opened, the package 60 can be easily opened by the same way as the package 50. Thus, such an embodiment of the package 60 can be repeatedly sealed and opened as well.

Figure 4B:
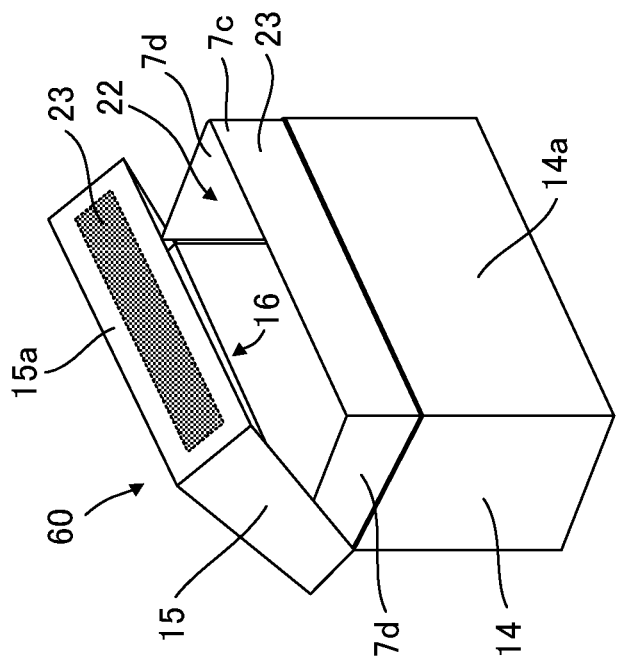

A package 70 according to another embodiment of the present invention will be described with reference to FIG. 4B. FIG. 4B shows a position of the package 70 being opened viewed from the same point as FIG. 3B. The self-adhesive (E) 23 is arranged over, and adhered and fixed to each of the surface of the outer front wall 7c of the package body 14, and the back face of the front wall 15a of the lid 15 in the package 70. The structure other than this is same as the package 50. When the package 70 is closed, the self-adhesives (E) 23 self-adhere to each other, to seal the package 70. Whereby, it is possible to improve the airtightness again even after the package is opened. When opened, the package 70 can be easily opened by the same way as the package 50. Thus, such an embodiment of the package 70 can be repeatedly sealed and opened as well. The package 70 can be especially preferably employed when the package body 14 and/or the lid 15 are/is constituted by material that the self-adhesive (E) 23 is hard to self-adhere because the self-adhesives (E) 23 self-adhere to each other according to the package 70.

Figure 5A:
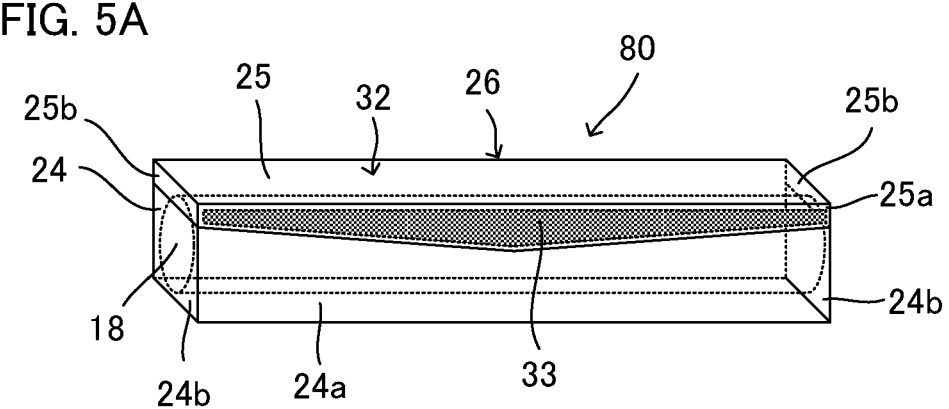
FIG. 5A is a perspective view showing a position of a package 80 being closed.
Figure 5B:
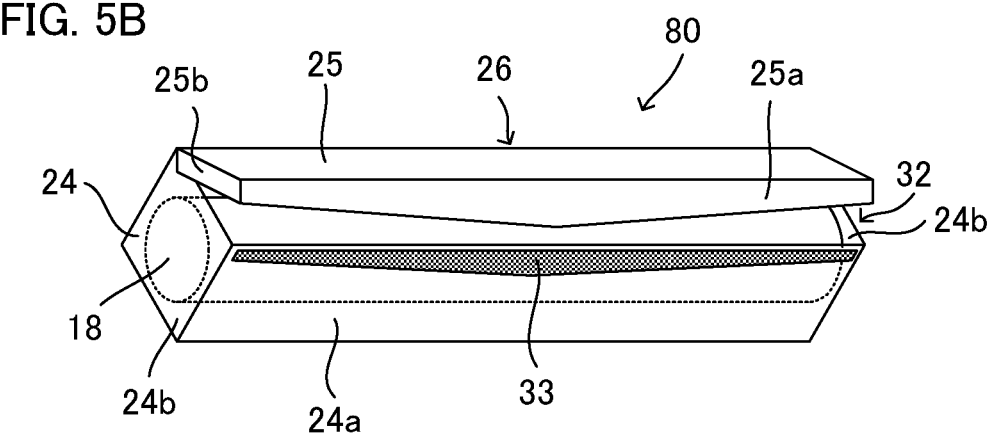
FIG. 5B is a perspective view showing a position of the package 80 being opened.

A package 80 according to further another embodiment of the present invention will be described with reference to FIGS. 5A and 5B. FIG. 5A is a perspective view in a position of the package 80 being closed, and FIG. 5B is a perspective view in a position of the package 80 being opened. The package 80 includes a package body 24 that forms with an opening 32, and a lid 25 with which the opening 32 of the package body 24 is covered. The package body 24 and the lid 25 connect along an upper edge 26 of the package body 24. The lid 25 is a hinged lid. The closed (FIG. 5A) and opened (at least FIG. 5B) positions can be taken by the lid 25 rotating around the upper edge 26. Wrapping film 18 is stored in the package 80.

In this embodiment, in the position of the package 80 being closed, the package body 24 and the lid 25 are in contact with each other over the back faces of a front wall 25*a*, and side walls 25*b*, 25*b* of the lid 25.

A self-adhesive (E) 33 is arranged on a portion of the surface of a front wall 24*a* of the package body 24 which is to be in contact with the back face of the front wall 25*a* of the lid 25 in the package 80.

The self-adhesive (E) 33 is adhered and fixed to the surface of the front wall 24*a* of the package 80. When the package 80 is closed, the self-adhesive (E) 33 self-adheres to the back face of the front wall 25*a* of the lid 25, to seal the package 80. Whereby, it is possible to improve the airtightness again even after the package is opened. When the package 80 is opened again, a nail or the like is hooked under the lower edge of the front wall 25*a* of the lid 25, or the front wall 24*a* of the package body 24 is pressed from the outside, thereby the self-adhesive (E) 33 is separated from the front wall 25*a* of the lid 25, and the package can be easily opened. When the package is opened, self-adhesion of the self-adhesive (E) 33 is not damaged. Thus, the package 80 can be repeatedly sealed and opened.

In view of improving airtightness of the package 80, the self-adhesive (E) 33 is preferably arranged all over the contact portions of the package body 24 and the lid 25 (that is, not only over the front wall 24*a* but also over side walls 24*b*, 24*b* of the package body 24). On the other hand, in view of easy opening, the self-adhesive (E) 33 is preferably arranged only over the front wall 24*a*. A position where the self-adhesive (E) is arranged among the contact portions of the package body and the lid can be suitably set according to airtightness and easy openability that are demanded from the package.

Figure 6A:
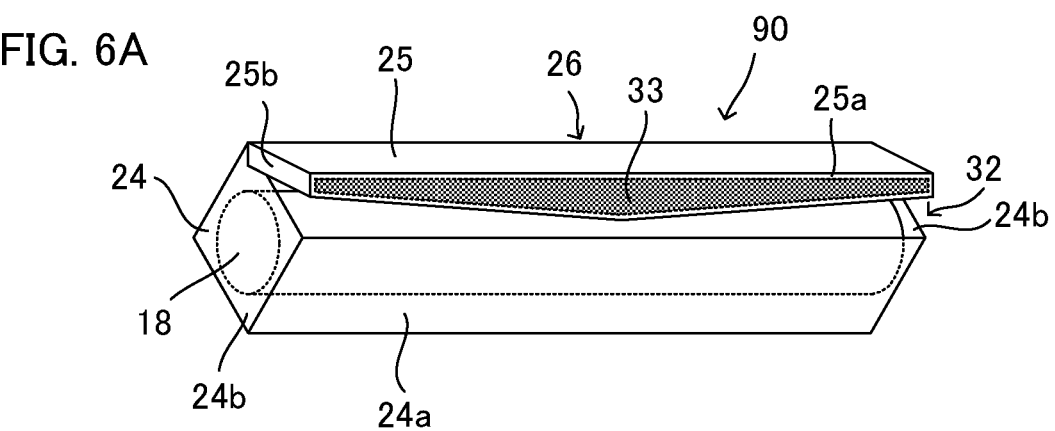
FIGS. 6A and 6B are perspective views showing positions of packages 90 and 100 being opened respectively.

A package 90 according to another embodiment of the present invention will be described with reference to FIG. 6A. FIG. 6A shows a position of the package 90 being opened viewed from the same point as FIG. 5B. The self-adhesive (E) 33 is arranged over, and adhered and fixed to the back face of the front wall 25*a* of the lid 25 in the package 90. The structure other than this is same as the package 80. When the package 90 is closed, the self-adhesive (E) 33 self-adheres to the surface of the front wall 24*a* of the package body 24, to seal the package 90. Whereby, it is possible to improve the airtightness again even after the package is opened. When opened, the package 90 can be easily opened by the same way as the package 80. Thus, such an embodiment of the package 90 can be repeatedly sealed and opened as well.

Figure 6B:
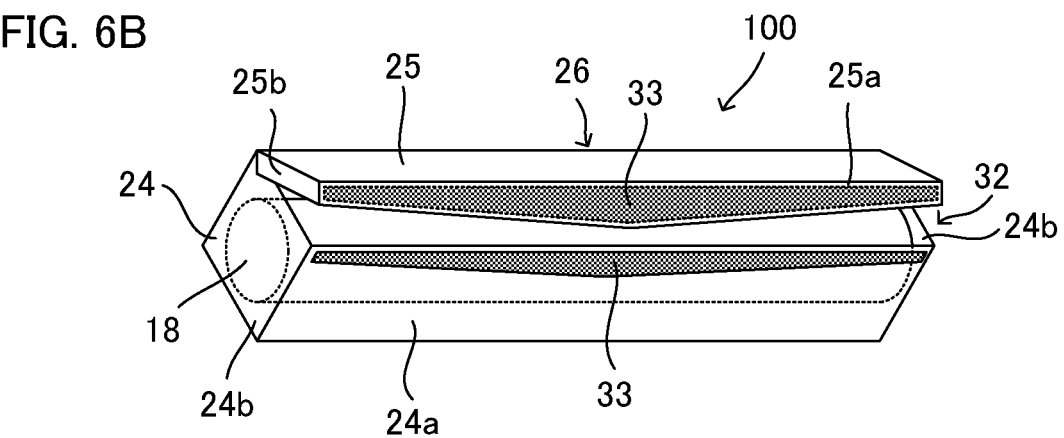

A package 100 according to another embodiment of the present invention will be described with reference to FIG. 6B. FIG. 6B shows a position of the package 100 being opened viewed from the same point as FIG. 5B. The self-adhesive (E) 33 is arranged on, and adhered and fixed to each of the surface of the front wall 24*a* of the package body 24, and the back face of the front wall 25*a* of the lid 25 in the package 100. The structure other than this is same as the package 80. When the package 100 is closed, the self-adhesives (E) 33 self-adhere to each other, to seal the package 100. Whereby, it is possible to improve the airtightness again even after the package is opened. When opened, the package 100 can be easily opened by the same way as the package 80. Thus, such an embodiment of the package 100 can be repeatedly sealed and opened as well. The package 100 can be especially preferably employed when the package body 24 and/or the lid 25 are/is constituted by material that the self-adhesive (E) 33 is hard to self-adhere because the self-adhesives (E) 33 self-adhere to each other according to the package 100.

In the package of the present invention, the structure except the self-adhesive (E) is not restricted as long as including a hinged lid, and as long as there exists a contact portion of the package body and the lid (hinged lid). A known structure can be employed.

In the package of the present invention, while not restricted, material for the members other than the self-adhesive (E) is preferably what the self-adhesive (E) is easy to self-adhere to. Examples thereof include resin, metal, and paper. Among them, paper is preferable in view of light weight, low costs, and low environmental burdens.

A method for applying the self-adhesive (E) to at least part of the contact portion of the package body and the lid is not restricted. For example, the self-adhesive (E) may be adhered and fixed to a planar blank in advance before the blank is assembled to a box, to assemble blank to a box after that. Or, the self-adhesive (E) may be adhered and fixed after the blank is assembled to a box. A method for adhering the self-adhesive (E) to the package body and/or the lid is not restricted. The self-adhesive (E) can be adhered with a known adhesive.

The present invention has been described with the packages 10, 20, 30, 40, 50, 60, 70, 80, 90, and 100 as examples. The present invention is not limited thereto. Packages shown in FIGS. 7A to 7E may be further encompassed. The upper row of FIGS. 7A to 7E shows perspective views showing positions of the packages being opened, and the lower row thereof shows perspective views showing positions of the packages being closed. FIGS. 7A to 7E show the embodiment that the self-adhesives self-adhere to each other in the closed position. However, such an embodiment may be encompassed that the self-adhesive is arranged on either the package body or the lid (in FIG. 7E, one of two boxes both of which can be the package body and the lid), and that the self-adhesive self-adheres to the package body or the lid in the closed position.

In addition, the package of this invention may be a sliding-type box (sliding box) as shown in FIGS. 8A and 8B. In FIGS. 8A and 8B, the upper row shows positions of the packages being opened and the lower row shows positions of the packages being closed. A sliding box consists of an inner box whose top face is open (package body), and an outer box that surrounds the outside of the inner box (lid part). The package shown in FIG. 8A has a rotation piece along an end part of an inner box which is rotatable in a way of a hinge. In the closed position, the package is sealed by self-adhesion of the self-adhesive that is arranged over the rotation piece, and the self-adhesive that is arranged over the top face of the outer box to each other. The package shown in FIG. 8B is sealed by self-adhesion of the self-adhesive that is arranged over the top face of an end part of the inner box, and the self-adhesive that is arranged over the surface on the inner box side of the top face of the outer box to each other. FIGS. 8A and 8B show the embodiment that the self-adhesives self-adhere to each other in the closed position. Such an embodiment may be encompassed that the self-adhesive is arranged either on the package body or on the lid, and the self-adhesive self-adheres to the package body or the lid in the closed position.

2. Self-Adhesive (E)

The self-adhesive (E) will be described. The self-adhesive (E) of the present invention is a cross-linking material of a resin composition (C) containing a (meth)acrylic acid ester copolymer resin (A), and a crosslinking agent (B).

<(Meth)Acrylic Acid Ester Copolymer Resin (A)>

Hereinafter, the (meth)acrylic acid ester copolymer resin (A) used in the present invention will be described.

The (meth)acrylic acid ester copolymer resin (A) used in the present invention is not restricted. A glass transition temperature thereof is preferably −10° C. or less, and more preferably −13° C. or less. The above described upper limit or less of the glass transition temperature of the (meth) acrylic acid ester copolymer resin (A) makes it easy to have the gel fraction of the (meth)acrylic acid ester copolymer resin (A) described below of a predetermined upper limit or less. As a result, it becomes easy to make the self-adhesive (E) having proper self adhesion strength and excellent smoothness. While not specifically provided, the lower limit is preferably −40° C. or more. When photo-curable resin such as epoxy acrylate, and urethane acrylate is used as the (meth) acrylic acid ester copolymer resin (A), photo-curing reaction can be achieved.

The (meth)acrylic acid ester copolymer resin (A) consists of no less than 50% by mass of monomeric units derived from (meth)acrylic acid ester monomer and no more than 50% by mass of monomeric units derived from monomer copolymerizable with the (meth)acrylic acid ester monomer; preferably, no less than 70% by mass of monomeric units derived from (meth)acrylic acid ester monomer and no more than 30% by mass of monomeric units derived from monomer copolymerizable with the (meth)acrylic acid ester monomer; more preferably, no less than 80% by mass of monomeric units derived from (meth)acrylic acid ester monomer and no more than 20% by mass of monomeric units derived from monomer copolymerizable with the (meth)acrylic acid ester monomer; and further preferably, no less than 80% by mass of monomeric units derived from (meth)acrylic acid ester monomer and no more than 20% by mass of monomeric units derived from monomer copolymerizable with the (meth)acrylic acid ester monomer. The content of the monomeric units derived from (meth)acrylic acid ester monomer within the above described range makes it possible for the resin to acquire a proper adhesive property.

In the present invention, the (meth)acrylic acid ester copolymer resin (A) preferably has a N-methylol group. Using the (meth)acrylic acid ester copolymer resin (A) having a N-methylol group makes it easy to have the gel fraction described below of a predetermined upper limit or less. As a result, it becomes easy to make the self-adhesive (E) having proper self adhesion strength and excellent smoothness. When the (meth)acrylic acid ester copolymer resin (A) has a N-methylol group, a N-methylol group is usually included in a monomeric unit copolymerizable with (meth)acrylic acid ester monomer, and may be included in a monomeric unit of (meth)acrylic acid ester as well.

(Meth)acrylic acid ester monomer applicable to the present invention is not limited, and preferably, units of (meth) acrylic acid ester monomer composing homopolymer of −20° C. or below in glass transition temperature are contained in view of easily making the glass transition temperature of the (meth)acrylic acid ester copolymer resin (A) −10° C. or below, which is a preferred embodiment.

Non-limiting examples of the above described (meth) acrylic acid ester monomer composing homopolymer of −20° C. or below in glass transition temperature include: (meth)acrylic acid alkyl esters composing homopolymer of −20° C. or below in glass transition temperature such as ethyl acrylate (homopolymer therefrom is −24° C. in glass transition temperature. Hereinafter the same will be indicated in parentheses), n-propyl acrylate (−37° C.), n-butyl acrylate (−54° C.), sec-butyl acrylate (−22° C.), n-heptyl acrylate (−60° C.), n-hexyl acrylate (−61° C.), n-octyl acrylate (−65° C.), 2-ethylhexyl acrylate (−50° C.), n-octyl methacrylate (−25° C.), and n-decyl methacrylate (−49° C.); and (meth)acrylic acid alkoxyalkyl esters composing homopolymer of −20° C. or below in glass transition temperature such as: 2-methoxyethyl acrylate (−50° C.), 3-methoxypropyl acrylate (−75° C.), 3-methoxybutyl acrylate (−56° C.), and ethoxymethyl acrylate (−50° C.). Among them, (meth)acrylic acid alkyl esters composing homopolymer of −20° C. or below in glass transition temperature, and (meth)acrylic acid alkoxyalkyl esters composing homopolymer of −20° C. or below in glass transition temperature are preferable, and (meth)acrylic acid alkyl esters composing homopolymer of −20° C. or below in glass transition temperature are more preferable.

Other than the above described (meth)acrylic acid ester monomer composing homopolymer of −20° C. or below in glass transition temperature, methyl acrylate (homopolymer is 10° C. in glass transition temperature. Hereinafter the same will be indicated in parentheses), methyl methacrylate (105° C.), ethyl methacrylate (63° C.), n-propyl methacrylate (25° C.), n-butyl methacrylate (20° C.) or the like may be used.

Only one kind of the above described (meth)acrylic acid ester monomer may be used. Alternatively, two or more kinds thereof may be used together.

It is preferable to use monomer including a N-methylol group such as N-methylolacrylamide and N-methylolmethacrylamide as monomer copolymerizable with (meth)acrylic acid ester monomer (hereinafter referred to as "monomer for copolymerization"). Use of monomer including a N-methylol group easily leads to the (meth)acrylic acid ester copolymer resin (A) including a N-methylol group. Thus, as described above, it becomes easy to make the self-adhesive (E) having proper self adhesion strength, and excellent smoothness. In the above described view, the proportion of the use of monomer including a N-methylol group is as follows: monomeric units derived from monomer including a N-methylol group are preferably 0.1 to 10% by mass, and more preferably 0.5 to 5% by mass when the (meth)acrylic acid ester copolymer resin (A) is 100% by mass.

In addition to the above described monomer including a N-methylol group, or instead of the above described monomer including a N-methylol group, another kind of monomer may be used together as monomer for copolymerization. Such kind of monomer is not limited. Specific examples thereof include α,β-ethylenically unsaturated polyvalent carboxylic acid complete esters, alkenyl aromatic monomer, vinyl cyanide monomer, esters of carboxylic acids and unsaturated alcohols, olefinic monomer, and another monomer including a functional group. Only one kind of the above monomer may be used, or two or more kinds thereof may be used together.

Specific examples of α,β-ethylenically unsaturated polyvalent carboxylic acid complete esters include dimethyl fumarate, diethyl fumarate, dimethyl maleate, diethyl maleate, and dimethyl itaconate.

Specific examples of alkenyl aromatic monomer include styrene, α-methylstyrene, methyl α-methylstyrene, and vinyltoluene.

Specific examples of vinyl cyanide monomer include acrylonitrile, methacrylonitrile, α-chloroacrylonitrile, and α-ethylacrylonitrile.

Specific examples of esters of carboxylic acids and unsaturated alcohols include vinyl acetate.

Specific examples of olefinic monomer include ethylene, propylene, butene, and pentene.

Monomer including a functional group may be used as monomer for copolymerization for the purpose of efficient crosslinking inside or between copolymer.

Examples of functional groups mentioned here include organic acid groups, hydroxyl group, amino group, amide group, mercapto group, and epoxy groups.

Monomer including organic acid groups is not limited, and the representative thereof include monomer having an organic acid group such as a carboxyl group, an acid anhydride group, and a sulfonic acid group. Other than them, monomer containing a sulfenic acid group, a sulfinic acid group, and a phosphoric acid group can be used as well.

Specific examples of monomer having a carboxyl group include: $\alpha,\beta$-ethylenically unsaturated monocarboxylic acids such as acrylic acid, methacrylic acid, and crotonic acid; $\alpha,\beta$-ethylenically unsaturated polyvalent carboxylic acids such as itaconic acid, maleic acid, and fumaric acid; and in addition, $\alpha,\beta$-ethylenically unsaturated polyvalent carboxylic acid partial esters such as monomethyl itaconate, monobutyl maleate, and monopropyl fumarate. Monomer including a group from which a carboxyl group can be derived by hydrolysis etc., such as maleic anhydride, and itaconic anhydride, can be used as well.

Specific examples of monomer having a sulfonic acid group include $\alpha,\beta$-unsaturated sulfonic acids such as allylsulfonic acid, methallylsulfonic acid, vinylsulfonic acid, styrenesulfonic acid, and acrylamido-2-methylpropane sulfonic acid; and salts thereof.

In a case where monomer including an organic acid group is used, such an amount of this monomer is subjected to polymerization that monomeric units derived therefrom are preferably 0.1 to 20% by mass, and more preferably 0.5 to 15% by mass when the (meth)acrylic acid ester copolymer resin (A) is 100% by mass. The usage of monomer including an organic acid group within the above described range makes it easy to keep the viscosity of the polymerization system in polymerization within a proper range, and to prevent self-adhesion of the self-adhesive (E) from being lost due to excessive progress of crosslinking of copolymer.

A monomeric unit including an organic acid group is easy and preferable to be introduced into the (meth)acrylic acid ester copolymer resin (A) according to polymerization of monomer including an organic acid group. An organic acid group may be introduced according to a known polymer reaction after the (meth)acrylic acid ester copolymer resin (A) forms.

Examples of monomer having a hydroxyl group include hydroxy alkyl(meth)acrylic acid esters such as 2-hydroxyethyl (meth)acrylate, and 3-hydroxypropyl (meth)acrylate.

Examples of monomer having an amino group include N,N-dimethylaminomethyl (meth)acrylate, N,N-dimethylaminoethyl (meth)acrylate, and aminostyrene.

Examples of monomer having an amide group include $\alpha,\beta$-ethylenically unsaturated carboxylic acid amide monomer such as acrylamide, methacrylamide, and N,N-dimethylacrylamide.

Examples of monomer having an epoxy group include glycidyl(meth)acrylate, and allyl glycidyl ether.

In a case where monomer including a functional group other than the above organic acid groups is used, such an amount of this monomer is preferably used for polymerization that monomeric units derived therefrom is no more than 10% by mass when the (meth)acrylic acid ester copolymer resin (A) is 100% by mass. If the usage of monomer having a functional group other than organic acid groups is no more than 10% by mass, the viscosity of the polymerization system in polymerization can be easily kept within a proper range, and self-adhesion of the self-adhesive (E) can be easily prevented from being lost due to excessive progress of crosslinking of copolymer.

Polyfunctional monomer having a plurality of polymerizable unsaturated bonds may be used together as monomer for copolymerization. Unsaturated bond-terminated polyfunctional monomer is preferable. Using such polyfunctional monomer makes it possible to introduce intramolecular and/or intermolecular crosslinking into the (meth)acrylic acid ester copolymer resin (A), to improve cohesive force.

Examples of polyfunctional monomer that can be used here include: polyfunctional (meth)acrylates such as 1,6-hexanediol di(meth)acrylate, 1,2-ethylene glycol di(meth)acrylate, 1,12-dodecanediol di(meth)acrylate, polyethylene glycol di(meth)acrylate, polypropyleneglycol di(meth)acrylate, neopentylglycol di(meth)acrylate, pentaerythritol di(meth)acrylate, trimethylolpropane tri(meth)acrylate, pentaerythritol tri(meth)acrylate, ditrimethylolpropane tri(meth)acrylate, pentaerythritol tetra(meth)acrylate, and dipentaerythritol hexa(meth)acrylate; substituted triazines such as 2,4-bis(trichloromethyl)-6-p-methoxystyrene-5-triazine; and in addition, mono-ethylenically unsaturated aromatic ketones such as 4-acryloxybenzophenone. Polyfunctional (meth)acrylates are preferable, and pentaerythritol di(meth)acrylate, pentaerythritol tri(meth)acrylate, and pentaerythritol tetra(meth)acrylate are more preferable. Only one kind of polyfunctional monomer may be used, or two or more kinds thereof may be used together.

The (meth)acrylic acid ester copolymer resin (A) can be obtained by copolymerization of (meth)acrylic acid ester monomer and monomer for copolymerization. Any of polymerization methods such as solution polymerization, emulsion polymerization, suspension polymerization, bulk polymerization, and any other methods may be used when the (meth)acrylic acid ester copolymer resin (A) is obtained. Types and amounts of a polymerization initiator, an emulsifying agent, a dispersing agent, and the like that are used for polymerization are not limited as well. Methods for adding monomer, a polymerization initiator, an emulsifying agent, a dispersing agent, and the like upon polymerization are not limited as well. Also, there is no limitation on polymerization temperature, polymerization pressure, stirring conditions, and the like.

The (meth)acrylic acid ester copolymer resin (A) may be either solid or a dispersion. If an emulsion or dispersion obtained from emulsion polymerization or dispersion polymerization is used as it is, operation is easy in mixing with a crosslinking agent and a conductive compound, and it is convenient to foam the obtained emulsion or dispersion.

The gel fraction of the (meth)acrylic acid ester copolymer resin (A) is preferably 70% or less, and more preferably 65% or less. The gel fraction within the above range makes it easy to make the self-adhesive (E) of proper self adhesion strength, and excellent smoothness.

The gel fraction in the present invention is a value obtained from the following formula after: in 100 ml of ethyl acetate, 500 mg of a sample of an acrylic acid ester copolymer resin is immersed at normal temperature for 3 days; after that, insoluble matters are filtered through woven metal of 200 mesh, and air-dried at normal temperature for 15 hours; after that, the resulting matters are dried at 100° C. for 2 hours, and a dry mass of the resulting insoluble content is weighed.

Gel fraction (% by mass)=((a dry mass of the insoluble content after the immersion in ethyl acetate)/(a mass of the sample before the immersion in ethyl acetate))×100

<Crosslinking Agent (B)>

The crosslinking agent (B) used in this invention is not restricted. For example, a melamine crosslinking agent that is preferably used for foam material conventionally in view of improving strength, etc. can be used.

Any non-limiting conventionally known melamine crosslinking agent can be used in this invention. Examples thereof include melamine, methylol melamine obtained by condensation of melamine and formaldehyde, partially or completely etherified compounds obtained by reaction of a lower alcohol with methylol melamine, and mixtures thereof. A melamine crosslinking agent used therein may be monomer, a condensation product consisting of polymer that is at least dimer, or mixture thereof.

Examples of the above described methylol melamine include monomethylol melamine, dimethylol melamine, trimethylol melamine, tetramethylol melamine, pentamethylol melamine, and hexamethylol melamine.

Examples of the above described lower alcohol used for etherifying methylol melamine include methyl alcohol, ethyl alcohol, isopropyl alcohol, n-butanol, and isobutanol.

A compound contained in the melamine crosslinking agent includes imino group, methylol group, or alkoxymethyl group such as methoxymethyl group, and butoxymethyl group in a molecule as a functional group, for example. Examples of such a compound include imino group-type methylated melamine, methylol group-type melamine, methylol group-type methylated melamine, and complete alkyl-type methylated melamine.

The melamine crosslinking agent forms an intramolecular or intermolecular crosslinked structure in (meth)acrylic acid ester copolymer according to reaction of the above functional group thereof with a N-methylol group in the (meth)acrylic acid ester copolymer resin (A). The melamine crosslinking agent is excellent in crosslinking effect at high temperature equal to or over 120° C. The melamine crosslinking agent is preferable because the self-adhesive (E) excellent in strength and self-adhesion can form.

When the melamine crosslinking agent is used as the crosslinking agent (B), the usage of the melamine crosslinking agent is preferably 1 to 20 parts by mass, and more preferably 3 to 15 parts by mass as a solid, to 100 parts by mass of the (meth)acrylic acid ester copolymer resin (A). The usage of the melamine crosslinking agent within the above described range makes it possible to have a proper self adhesion strength, and to improve strength of the resin after crosslinking.

A carbodiimide crosslinking agent (B1) may be used as the crosslinking agent (B) used in the present invention instead of, or in addition to the melamine crosslinking agent. Using the carbodiimide crosslinking agent (B1) makes it possible to reduce the emission of formaldehyde that forms in a crosslinking reaction of the (meth)acrylic acid ester copolymer resin (A) having a N-methylol group. Thus, the self-adhesive (E) from which a reduced amount of formaldehyde is emitted can be made.

The carbodiimide crosslinking agent (B1) used in the present invention is not restricted. A compound where two or more carbodiimide groups are included in a molecule is preferably used. A known carbodiimide compound can be used as such a compound.

Either synthesized or commercially available carbodiimide compound may be used as a known carbodiimide compound described above. Examples of a commercially available carbodiimide compound include "DICNAL HX" manufactured by DIC Corporation, and "CARBODILITE" manufactured by Nisshinbo Chemical Inc. When a carbodiimide compound is synthesized, for example, a polycarbodiimide compound that is carbodiimidized polyisocyanate by decarboxylative condensation reaction in the presence of a carbodiimidization catalyst can be used.

Examples of a polyisocyanate of raw material include hexamethylene diisocyanate (HDI), hydrogenated xylylene diisocyanate (H6XDI), xylylene diisocyanate (XDI), 2,2,4-trimethylhexamethylene diisocyanate (TMHDI), 1,12-diisocyanatedecane (DDI), norbornane diisocyanate (NBDI), 2,4-bis-(8-isocyanateoctyl)-1,3-dioctylcyclobutane (OCDI), 4,4'-dicyclohexylmethane diisocyanate (HMDI), tetramethylxylylene diisocyanate (TMXDI), isophorone diisocyanate (IPDI), 2,4,6-triisopropylphenyldiisocyanate (TIDI), 4,4'-diphenylmethane diisocyanate (MDI), tolylene diisocyanate (TDI), and hydrogenated tolylene diisocyanate (HTDI). A carbodiimide compound can be synthesized by: stirring and mixing a polyisocyanate within the temperature range of 0 to 200° C. for any length of time in the presence of an air flow or bubbling of an inert gas; after that, adding the resultant along with a carbodiimidization catalyst, and stirring and mixing them.

Here, preferably, a carbodiimidization catalyst described above is an organophosphorus compound. Specifically, a phospholene oxide is preferable in view of activity. Specific examples thereof include 3-methyl-1-phenyl-2-phospholene-1-oxide, 3-methyl-1-ethyl-2-phospholene-1-oxide, 1,3-dimethyl-2-phospholene-1-oxide, 1-ethyl-2-phospholene-1-oxide, 1-methyl-2-phospholene-1-oxide, and double bond isomer thereof.

The carbodiimide crosslinking agent (B1) forms an intramolecular or intermolecular crosslinked structure in the (meth)acrylic acid ester copolymer according to reaction of a carbodiimide group thereof with a N-methylol group in the (meth)acrylic acid ester copolymer resin (A). The carbodiimide crosslinking agent (B1) is excellent especially in crosslinking effect at low temperature. The carbodiimide crosslinking agent (B1) is preferable because the self-adhesive (E) excellent in strength and self-adhesion can form.

When the carbodiimide crosslinking agent (B1) is used as the crosslinking agent (B), the usage of the carbodiimide crosslinking agent (B1) is preferably 0.1 to 20 parts by mass, and more preferably 0.5 to 15 parts by mass as a solid, to 100 parts by mass of the (meth)acrylic acid ester copolymer resin (A). The usage of the carbodiimide crosslinking agent (B1) within the above described range makes it possible to have a proper self adhesion strength, and to improve strength of the resin after crosslinking.

Instead of, or in addition to the above described melamine crosslinking agent and/or the carbodiimide crosslinking agent (B1), other crosslinking agents may be used as well such as: epoxy resins such as polyethylene glycol diglycidyl ether, glycerin polyglycidyl ether, sorbitol polyglycidyl ether, and bisphenol A polyglycidyl ether; aziridines such as ethylenimine derivatives including aldehyde and acrolein; multifunctional isocyanate crosslinking agents such as tolylene diisocyanate, trimethylolpropane tolylene diisocyanate, and diphenylmethane triisocyanate; oxazoline crosslinking agents; metal salt-based crosslinking agents; metal chelate-based crosslinking agents; peroxide-based crosslinking agents; aldehyde resins such as urea-formaldehyde resins, and phenolformaldehyde resins; and photoinitiators such as benzophenone photoinitiators, acetophenone photoinitiators, thiaxanthone photoinitiators, sulfonium photoinitiators, and iodonium photoinitiators.

(Other Additives)

The resin composition (C) may contain a formaldehyde scavenger.

Formaldehyde scavengers that can be used for the present invention are not limited as long as being compounds that physically adhere to formaldehyde or that can chemically react with formaldehyde. Formaldehyde scavengers may be either inorganic compounds or organic compounds that include even polymer.

Specific examples of formaldehyde scavengers include: nitrogen-containing compounds such as hydroxylamine sulfate, hydroxylamine hydrochloride, ammonium acetate, urea, ethyleneurea, dicyandiamide, polyamide resins, triazine compounds, and hydrazide compounds; halogen oxides such as stabilized chlorine dioxide; and metallic salts such as disodium hydrogen phosphate, zinc sulfate, calcium chloride, and magnesium sulfate. Among them, nitrogen-containing compounds are preferable and hydroxylamine sulfate is especially preferable in view of easy availability, operability and formaldehyde scavenging performance.

One of these formaldehyde scavengers may be used individually, or two or more of them may be used together.

The resin composition (C) can contain various additives if necessary in order to improve processability in processes of producing the self-adhesive (E), and to improve performance of the self-adhesive (E) to be obtained.

Examples of additives include foam stabilizers, auxiliary blowing agents, thickeners, fillers, antiseptics, fungicides, gelatinizers, flame retardants, anti-aging agents, antioxidants, pigments, dyes, tackifiers, photosensitizers, and conductive compounds.

As foam stabilizers, the following can be used: ammonium salts of fatty acids such as ammonium stearate, sulfonic acid-type anionic surfactants such as alkyl sulfosuccinates, quaternary alkylammonium chlorides, amphoteric compounds of alkyl betaines, and alkanolamine salts of fatty acids.

As auxiliary blowing agents, the following can be used: sodium lauryl sulfate, sodium alkyl diphenyl ether disulphonate, and sodium polyoxyethylene alkylphenol ether sulfate.

As thickeners, the following can be used: acrylic polymer particles, inorganic compounds particulates such as fine silica particles, and reactive inorganic compounds such as magnesium oxide.

As fillers, the following can be used: calcium carbonate, magnesium carbonate, aluminum hydroxide, magnesium hydroxide, barium hydroxide, clay, kaolin, and glass powder.

Examples of antiseptics and fungicides that can be used here include dihydroxy dichlorophenylmethane, sodium pentachlorophenate, 2,3,4,6-tetrachloro-4-(methylsulfonyl) pyridine, 2,3,5,6-tetrachloro-4-(methyl sulfonyl)pyridine, bis(tributyltin) oxide, hexahydro-1,3,5-triethyl-s-triazine, silver complexes, and zinc complexes.

As gelatinizers, the following can be used: ammonium salts such as ammonium acetate, ammonium chloride, and ammonium carbonate; alkylphenol alkylene oxide addition products; polyvinylmethyl ether; polypropylene glycol; polyether polyformal; methylcellulose; hydroxyethyl cellulose; and silicone heat sensitizers.

As flame retardants, the following can be used: phosphoric acid ester compounds, halogen phosphoric acid ester compounds, ammonium polyphosphate, antimony trioxide, zinc borate, barium metaborate, ammonium hydroxide, magnesium hydroxide, tin compounds, organophosphorous compounds, red phosphorus compounds, and silicone flame retardants.

Antioxidants based on polyphenol, hydroquinone, hindered amine, and the like can be used here.

Examples of pigments and dyes include titan oxide, carbon black, iron oxide red, and quinacridone.

As tackifiers, any compounds selected from the following can be used: rosin resins such as gum rosins, tall oil rosins, wood rosins, hydrogenated rosins, disproportionated rosins, polymerized rosins, maleated rosins, rosin glycerol esters, and hydrogenated rosin glycerol esters; terpene based resins such as terpene resins, terpene phenol resins, and aromatic modified terpene resins; petroleum resins such as aliphatic petroleum resins, alicyclic petroleum resins, and aromatic petroleum resins; coumarone-indene resins; terpene phenol-based resins; phenol resins; hydrogenated rosin esters; disproportionated rosin esters; and xylene resins.

Examples of photosensitizers that can be used therein include: amines such as n-butylamine, trimethyl amine, N-methyl diethanolamine, piperidine, N,N-dimethylaniline, triethylenetetramine, and diethylaminoethyl (meth)acrylate; urea compounds such as O-tolylthiourea; sulfur compounds such as s-benzyl-isothiuronium-p-toluenesulfinate; nitriles such as N,N-dimethyl-p-aminobenzonitrile; and phosphorus compounds such as sodium diethyl thiophosphate. A photosensitizer is an additive that, although not activated by irradiation with ultraviolet rays or the like when used individually, has a function of promoting progress of radical polymerization when used with a photopolymerization initiator, compared to the case of using the photopolymerization initiator individually.

The self-adhesive (E) may be laminated to a base material. Laminating the self-adhesive (E) to a base material leads to adhesion of the face on the base material side to the package body and/or the lid of the package when the self-adhesive (E) is adhered and fixed to the package body and/or the lid. Whereby, adhesive compositions bleed over the surface (face on the self-adhesive (E) side), which makes it possible to prevent self-adhesion from being lost.

Specific examples of the base material include paper bases, and plastic sheets.

Here, examples of paper bases include woodfree paper, art paper, coated paper, kraft paper, cartonboard, and laminated paper obtained by laminating a thermoplastic resin such as polyethylene to any paper base described above.

In contrast, examples of plastic sheets include: polyester resins such as polyethylene terephthalate, and polyethylene naphthalate; polystyrene resins; polyvinyl chloride resins; acrylic resins; polycarbonate resins; polyamide resins; fluorocarbon polymers such as polytetrafluoroethylene; polyolefine resins such as polyethylene, and polypropylene; polycycloolefin resins; polyvinyl alcohol resins; poly(ethylene-vinylalcohol copolymer) resins; and sheets composed of mixtures or laminates thereof.

Thickness of a supporting layer consisting of the base material is not limited. Normally, thickness thereof is 10 µm to 200 µm.

<Resin Compound Foam (D)>

In the present invention, the resin composition (C) is preferably a resin composition foam (D) that is foamed. The resin composition (C) of the foamed resin composition foam (D) makes it possible for a cross-linking material of the resin composition (C) to have a foaming structure, and for the self-adhesive (E) consisting of the cross-linking material to show adsorption due to sucking effect using microcavities. A method for foaming the resin composition (C) will be described in detail in a foaming step S12 of the producing method described later. The self-adhesive (E) that adheres by adsorption is more excellent in releasability than the self-adhesive (E) that adheres only by pasting, and glue is difficult to remain. In addition, because foaming cells communicate, air bubbles come out well, and everyone can stick the self-adhesive (E) neatly.

3. Method for Producing Self-Adhesive (E)

Hereinafter the method for producing the self-adhesive (E) will be described.

Figure 9:
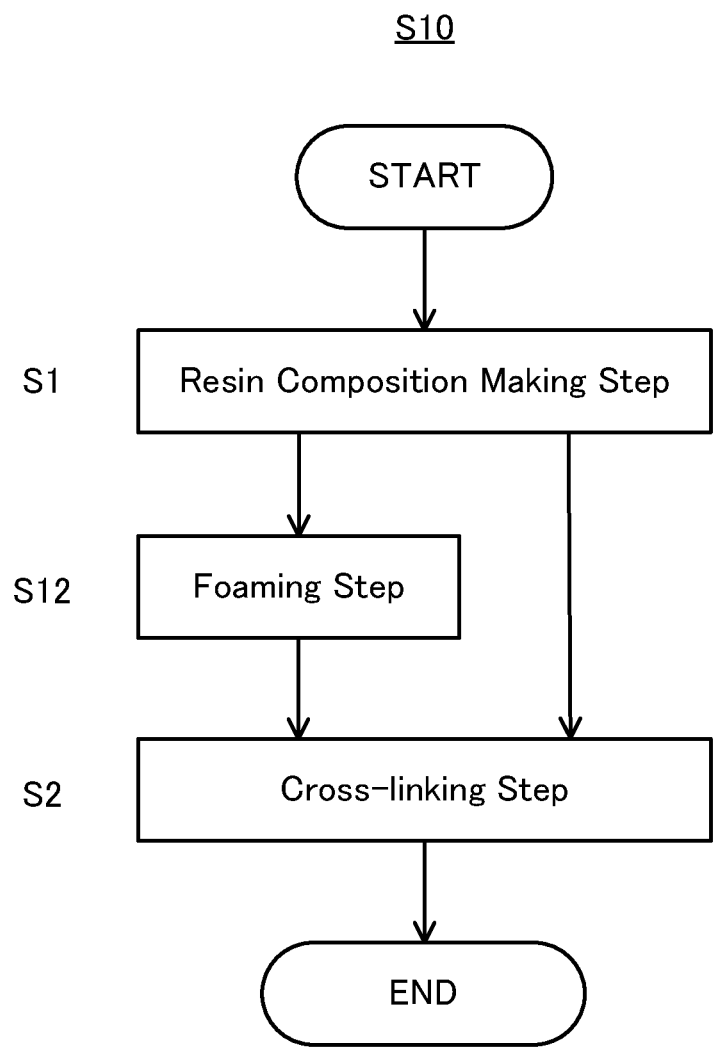
FIG. 9 is an explanatory flowchart of a method for producing a self-adhesive (E) according to one embodiment of the present invention.

FIG. 9 is an exemplary flowchart of a method for producing the self-adhesive (E) of the present invention S10 (hereinafter may be abbreviated as "this producing method S10"). As shown in FIG. 9, this producing method S10 includes a resin composition making step S1, and a cross-linking step S2 in this order. This producing method S10 preferably includes a foaming step S12 between the resin composition making step S1, and the cross-linking step S2. Hereinafter each step will be described.

(Resin Composition Making Step S1)

The resin composition making step S1 is a step of making the resin composition (C) containing the (meth)acrylic acid ester copolymer resin (A), and the crosslinking agent (B).

In the resin composition making step S1, the resin composition (C) can be made by mixing the (meth)acrylic acid ester copolymer resin (A), and the crosslinking agent (B), which are essential components, and other components used if desired, according to some method. Each substance used in this step, the proportion of the use thereof, etc. are as described above, and thus the description thereof is omitted here.

In case of being an emulsion or a dispersion, the (meth)acrylic acid ester copolymer resin (A) can be easily mixed with the crosslinking agent, and the other components just by adding them in a state of an aqueous dispersion, a water solution, or the like, to the resin (A) during stirring.

In a case where the (meth)acrylic acid ester copolymer resin (A) is a solid, a way of mixing is not restricted as well. For example, mixing may be carried out with a roll, a Henschel mixer, or a kneader. Either batch mixing or continuous mixing may be carried out.

Examples of a batch mixer include kneaders and stirrers for high viscosity raw material such as: a mortar machine, a kneader, an internal mixer, and a planetary mixer. Examples of a continuous mixer include a Farrel continuous mixer that is combination of a rotor and a screw, and a kneader of screw-type special structure. A single-screw extruder and a twin-screw extruder that are used for extruding are also included. At least two of these extruders and kneaders may be used in combination, or a plurality of machines of the same type may be coupled to be used.

The embodiment of the resin composition (C) of the present invention is not limited. The embodiment of either emulsion or dispersion makes it convenient to obtain the self-adhesive (E).

The viscosity of this emulsion or dispersion is preferably 2000 to 10000 mPa·s, and more preferably 3500 to 5500 mPa·s.

(Cross-Linking Step S2)

The cross-linking step S2 is a step of cross-linking the resin component (C). In the embodiment of including the foaming step S12 described later, the cross-linking step S2 is a step of cross-linking the resin composition foam (D).

In the cross-linking step S2, the self-adhesive (E) that is made by solidification of the resin composition (C) can be obtained by a crosslinking reaction of the (meth)acrylic acid ester copolymer resin (A) in the resin composition (C). The self-adhesive (E) obtained in the cross-linking step S2 is processed to be a desired shape by cutting or blanking, so as to match the shape of a portion where the self-adhesion (E) is to be arranged (at least part of the contact portion of the package body and the lid of the package).

Before the cross-linking step S2 is carried out, the resin composition (C) is preferably shaped into a sheet. Shaping the resin composition (C) into a sheet makes it possible to make the self-adhesive (E) having a sheet shape after the cross-linking step S2. The self-adhesive (E) having a sheet shape has a uniform thickness, and is easy to be processed to be a desired shape, so as to match the shape of a portion where the self-adhesion (E) is to be arranged.

It is also possible to obtain the self-adhesive (E) of a desired shape by carrying out the cross-linking step S2 after the resin composition (C) is shaped to be a desired shape by a method of putting the resin composition (C) into a mold of the desired shape, or the like.

A method for shaping the resin composition (C) into a sheet is not restricted. Preferred examples of such a method include a method of coating process paper such as a polyester film on which a releasing process is carried out, with the resin composition (C), to be shaped into a sheet.

The following coating devices, which are generally known, can be used for a method of coating process paper with the resin composition (C): a roll coater, a reverse roll coater, a screen coater, a doctor knife coater, a comma knife coater, a gravure coater, etc. Specifically, a uniform coating thickness can be obtained using a doctor knife coater.

The self-adhesive (E) that is made by solidification of the resin composition (C) of a sheet can be formed over process paper by a crosslinking reaction of the (meth)acrylic acid ester copolymer resin (A) after the resin composition (C) is shaped into a sheet over process paper as described above. At this time, if process paper having releasability is used, the self-adhesive (E) can be easily separated from this process paper.

When the self-adhesive (E) that is laminated to a base material is produced, the self-adhesive (E) can be formed over a base material in the cross-linking step S2 by using the above described base material as process paper, and a laminated sheet consisting of the self-adhesive (E), and the base material can be produced.

In the cross-linking step S2, preferably heating and drying is carried out when the (meth)acrylic acid ester copolymer resin (A) is subjected to crosslinking reaction. A method for heating and drying is not restricted as long as a foamed emulsion with which process paper is coated can be dried and crosslinked according to the method. An ordinary oven with hot air circulation, a hot air chamber with a hot oil circulator, a far infrared ray heater chamber, etc. can be used for this method. Drying temperature is properly 60° C. to 180° C. Drying conditions can be properly selected according to the properties of the emulsion, the coating amount, the coating thickness, etc. Preferably, drying is not carried out at fixed temperature but multi-stage drying is carried out such that: drying is carried out from the inside at lower temperature at the early stage, and through at higher temperature at the later stage. In addition, when a photo-curable resin is used as the (meth)acrylic acid ester copolymer resin (A), photo-curing can be achieved by light such as UV. A resin composition containing a photo-curable resin and a photoinitiator is irradiated with a predetermined amount of light by a lump such as a high pressure mercury lamp (main wavelength: 365 nm), to obtain a cured product. According to the embodiment of carrying out photo-curing in the cross-linking step S2, curing time can be shortened, which leads to increased productivity.

Density, thickness, hardness, etc. of the self-adhesive (E) to be obtained are adjusted according to the formation, the solid concentration, and conditions of solidifying by heating and drying of the resin composition (C), the mixing ratio of air bubbles in the embodiment of including the foaming step S12 described later, etc. The thickness of the self-adhesive (E) is preferably 0.03 to 3 mm, more preferably 0.05 to 1 mm, and especially preferably 0.05 to 0.5 mm. When the self-adhesive (E) of the present invention is used for the adhesion use of the package body and the lid of the package, the thickness of 0.03 mm or over leads to improved strength of the self-adhesive (E). In contrast, the thickness of 3 mm or below leads to good operability, and low costs. The density of the self-adhesive (E) is not restricted, and is preferably 0.1 to 1.0 g/cm$^3$ in view of impact absorbency.

(Foaming Step S12)

As described above, the foaming step S12 is preferably included between the resin composition making step S1 and the cross-linking step S2. Including the foaming step S12 makes it possible to produce a self-adhesive sheet having a foaming structure, and showing adsorption due to sucking effect using microcavities.

The foaming step S12 is a step of foaming the resin composition (C), to make the resin composition foam (D).

In the foaming step S12, the resin composition (C), which is made in the resin composition making step S1, is foamed, which makes it possible to obtain the resin composition foam (D) in an unsolidified state. When the resin composition (C) is in the embodiment of an emulsion or dispersion, a foamed emulsion or foamed dispersion is obtained.

Normally, mechanical foaming is employed as a foaming method. Foaming magnification may be properly adjusted, is usually 1.2 to 5 times, and is preferably 1.5 to 4 times. A method for mechanical foaming is not restricted. Mechanical foaming can be carried out by mixing a certain amount of air with the emulsion of the resin composition, and stirring the mixture with a continuous or batch type Oakes mixer, whipper, or the like. The foamed emulsion obtained according to this way is creamy.

Instead of the above described mechanical foaming, the resin composition foam (D) can be also prepared with, for example, a method of using a proper synthetic resin such as vinylidene chloride copolymer as a shell wall, and adding thermally expandable microcapsules that encompass a hydrocarbon compound of low boiling point to an acrylic resin emulsion or butadiene synthetic rubber emulsion.

4. Method for Using Self-Adhesive (E)

The method for using the self-adhesive (E) of the present invention is a method for uses for adhesion in a package in order to seal an opening, the package comprising: a space to store contents; and the opening by which the space and an outside communicate, the opening being repeatedly openable and sealable. Preferably, the package comprises: a package body that has the space to store the contents, the package body being formed with the opening; and a lid with which the opening of the package body can be covered, and the adhesion is at a contact portion of the package body and the lid. The method for using the self-adhesive (E) of the present invention is as described above concerning the above description about the package, using FIGS. 1A to 8B.

In the above description, the method for using the package having a hinged lid was described. The package for which the self-adhesive (E) can be used is not limited to this. For example, the self-adhesive (E) may be used for adhesion of a contact portion between flaps of a regular slotted container, a contact portion of a package body (body) and a lid (sleeve) of a sleeve box, a contact portion of a package body (inner body) and a lid (outer body) of a telescopic box (inner and outer trays), and a contact portion between the members that constitute handles of a cake box. Because particles of food, luxuries, etc. are hard to be attached to the self-adhesive (E), the self-adhesive (E) can be preferably used especially for tentative fixing after such a package is opened that particles therein are easy to scatter over the outside. Further, the self-adhesive (E) can increase airtightness of the package such as a box and a bag, can keep the contents fresh, and can prevent the contents from spoiling due to oxygen, moisture, and the like. Thus, the self-adhesive (E) can be used for packages of, for example, sweets, coffee, tea, cigarettes, and detergents as the use when packages may be repeatedly opened and closed, and the use when the contents have to be kept fresh, as described above.

EXAMPLES

The present invention will be described in more detail below. The present invention is not restricted to Examples. "Parts" and "%" used below will be on the basis of mass unless otherwise specified.

[Material Properties]

<Measurement of Glass Transition Temperature (Tg) of Acrylic Acid Ester Copolymer Resin>

The glass transition temperature (Tg) of the acrylic acid ester copolymer resin that was used for material for a self-adhesive described below was measured with the following method: 50 μm of a polyethylene terephthalate film in thickness was coated with the acrylic acid ester copolymer resin with a 250 μm applicator, and was dried at normal temperature for 24 hours, to obtain a resin film; and using this film as a sample, the glass transition temperature (° C.) was measured at −50° C. to 160° C. in measurement temperature at 10° C./min in heating rate with a differential scanning calorimeter (DSC6220 manufactured by SII Nano-Technology Inc.), conforming to JIS (Japanese Industrial Standards) K 7121. The results are shown in Table 1.

<Measurement of Gel Fraction of Acrylic Acid Ester Copolymer Resin>

The gel fraction of the acrylic acid ester copolymer resin used for a self-adhesive described later was measured with the following method: 50 μm of a polyethylene terephthalate film in thickness was coated with the acrylic acid ester copolymer resin with a 250 μm applicator, and dried at normal temperature for 24 hours, to obtain a resin film; a certain amount (X) (approximately 500 mg) of this film as a sample was precisely weighed, and was immersed in 100 ml of ethyl acetate at normal temperature for 3 days; after that, insoluble was filtered through a woven metal of 200 mesh, and air-dried at normal temperature for 15 hours; after that, the resultant was dried at 100° C. for 2 hours, and cooled at normal temperature; and after that, the mass of the sample (Y) was measured. The gel fraction was calculated by substitution of the values of X and Y into the following formula. The results are shown in Table 1.

$$\text{Gel Fraction (\%)} = (Y)/(X) \times 100$$

[Evaluation Category]

<Self Adhesion Strength>

(For Paper)

After a sheet obtained by laminating a self-adhesive layer consisting of a self-adhesive to a base material (hereinafter will be referred to as "self-adhesive laminated sheet") was made as described later, a test piece that was cut out into a size of 125 mm×25 mm was prepared. A self-adhesive layer side face of the test piece was stuck onto milk carton (KM-3 manufactured by KP PLATECH Co., Ltd.) of a smooth surface, and the test piece was contact-bonded with a 2 kgf loading roller from the top thereof, and allowed to stand at 23° C. at 50% RH for 1 hour. After that, an end of the test piece was fixed to an upper chuck of an Autograph (AG-IS manufactured by Shimadzu Corporation), the milk carton was fixed to a lower chuck thereof, and a 180° peeling test was carried out at 300 mm/min in speed at 23° C. at 50% RH. Test strength at this time was defined as a self adhesion strength (N/cm). The results are shown in Table 1. In a case where the result according to this evaluation is 0.01 to 2.5 N/cm, it can be said to have a proper self adhesion strength.

(Self-Adhesive Layers Each Other)

After the self-adhesive laminated sheet was made as described later, two test pieces that were cut out into a size of 125 mm×25 mm were prepared. A base material side face of one of the test pieces was stuck onto a SUS plate, self-adhesive layers were stuck onto each other, and the test pieces were contact-bonded with a 2 kgf loading roller from the top thereof, and allowed to stand at 23° C. at 50% RH for 1 hour. After that, the interface of a self-adhesive layer at an end of the test piece (on the side where the SUS plate was not stuck onto) of the self-adhesive laminated sheet was turned over, the turned end was fixed to an upper chuck of an Autograph (AG-IS manufactured by Shimadzu Corporation), the SUS plate was fixed to a lower chuck thereof, and a 180° peeling test was carried out at 300 mm/min in speed at 23° C. at 50% RH. The results are shown in Table 1. In a case where the result according to this evaluation is 0.01 to 2.5 N/cm, it can be said to have a proper self adhesion strength.

<Cohesive Peeling>

The base material face and the self-adhesive layer after the above described self adhesion strength measurement were visually inspected, and evaluated with the following two scales:

good: no cohering object of the self-adhesive layer was confirmed on the base material face; and bad; cohering object of the self-adhesive layer was confirmed on the base material face, or cohering object of the base material was confirmed on the self-adhesive layer.

*It is noted that in a case of double-sided peeling, the case where a self-adhesive layer was not confirmed on the other self-adhesive layer was evaluated as "good", and the case where a self-adhesive layer was confirmed on the other self-adhesive layer was evaluated as "bad".

It can be said to have repeating adhesion if the result of the self adhesive strength measurement is 0.01 to 2.5 N/cm, and the result of the cohesive peeling evaluation is good.

<Formaldehyde Dissipation Evaluation>

After the self-adhesive laminated sheet was made as described later, and further a separator film was stuck onto the surface of the self-adhesive layer, a test piece that was cut out into a size of 200 mm×200 mm was prepared. The test piece was put into a tedlar bag of 5 L in volume, and the bag was hermetically sealed. Air of 2 L was encapsulated in the bag, and the bag was allowed to stand for 6 hours in a constant temperature oven at 23° C. at 50% RH, and after that, the concentration of formaldehyde in the bag was measured with a detector tube (No. 91L manufactured by Gastec Corporation). The results are shown in Table 1, where the case where the concentration of formaldehyde was 0.2 ppm or below is indicated by "good", and the case where the concentration of formaldehyde was beyond 0.2 ppm is indicated by "bad".

<Glossiness (at 60°)>

Glossiness of the surface of the self-adhesive layer was measured using a gloss meter (GP-60A manufactured by Tokyo Denshoku. Co., Ltd.), conforming to JIS Z 8741. The results are shown in Table 1. In a case where the result according to this evaluation is 35 or more, it can be said that the surface of the sheet was excellent in smoothness.

[Making Self-Adhesive Laminated Sheet]

Example 1

Into a mixing vessel, 100 parts of a N-methylol group containing acrylic acid ester copolymer resin (I) in terms of the solid content, 3.6 parts of a carbodiimide crosslinking agent (DICNAL HX manufactured by DIC Corporation) in terms of the solid content, and 4.2 parts of a titanium oxide water dispersant (DISPERSE WHITE HG-701 manufactured by DIC Corporation) in terms of the solid content were added, and stirred with a disperser (composition of (I) was a copolymer resin of: 46.9 of ethyl acrylate/45.8 of butyl acrylate/5.9 of acrylonitrile/1.4 of N-methylolacrylamide; −25.9° C. in glass transition temperature; and 43.1% in gel fraction). Next, while continuing to be stirred, 2 parts of a thickener (carboxylic acid-modified acrylic acid ester polymer. ARON B-300K manufactured by Toagosei Co., Ltd.) in terms of the solid content, and 4.1 parts of a foam stabilizer [a 1/1 mixture of: a mixture of an amphoteric compound of alkyl betaine, and fatty acid alkanolamide (DICNAL M-20 manufactured by DIC Corporation)/a sulfonic acid-type anionic surfactant (DICNAL M-40 from DIC Corporation)] in terms of the solid content were added in this order, and the resultant was filtered through 150 mesh. Lastly, ammonia was added, to adjust the viscosity to 4500 mPa·s, and a resin composition was obtained.

This resin composition was stirred with a beater, to be whipped so that the foaming magnification was twice. Further, stirring was continued for 5 minutes at a lower stirring speed.

The obtained foamed mixture was applied onto a base material (a polyethylene terephthalate film of 50 μm in thickness) using a 0.3 mm applicator. The resultant was put into a drying oven, and kept at 80° C. for 1.33 minutes; at 120° C. for 1.33 minutes; and at 140° C. for 1.33 minutes, to dry-crosslinked. A self-adhesive layer (a self-adhesive) was laminated to the base material, and a self-adhesive laminated sheet according to Example 1 was obtained.

Example 2

A sheet according to Example 2 was made in the same manner as in Example 1 except using a carbodiimide crosslinking agent (CARBODILITE (registered trademark) E-02 manufactured by Nisshinbo Chemical Inc.) instead of the carbodiimide crosslinking agent (DICNALHX manufactured by DIC Corporation) used in Example 1.

Example 3

A sheet according to Example 3 was made in the same manner as in Example 1 except using a N-methylol group containing acrylic acid ester copolymer resin (II) whose composition was modified from that of the N-methylol group containing acrylic acid ester copolymer resin (I) used in Example 1, so as to have glass transition temperature of −17.6° C. and gel fraction of 28.0%.

Example 4

A sheet according to Example 4 was made in the same manner as in Example 1 except using a N-methylol group containing acrylic acid ester copolymer resin (III) whose composition was modified from that of the N-methylol group containing acrylic acid ester copolymer resin (I) used in Example 1, so as to have glass transition temperature of −10.1° C. and gel fraction of 42.2%.

Example 5

A sheet according to Example 5 was made in the same manner as in Example 1 except using a N-methylol group containing acrylic acid ester copolymer resin (IV) whose composition was modified from that of the N-methylol group containing acrylic acid ester copolymer resin (I) used in Example 1, so as to have glass transition temperature of −15.3° C. and gel fraction of 41.5%.

Example 6

A sheet according to Example 6 was made in the same manner as in Example 1 except using a N-methylol group containing acrylic acid ester copolymer resin (V) whose composition was modified from that of the N-methylol group containing acrylic acid ester copolymer resin (I) used in Example 1, so as to have glass transition temperature of −22.8° C. and gel fraction of 60.5%.

Example 7

A sheet according to Example 7 was made in the same manner as in Example 5 except using 2.2 parts of a carbodiimide crosslinking agent (CARBODILITE (registered trademark) E-02 manufactured by Nisshinbo Chemical Inc.) instead of 3.6 parts of the carbodiimide crosslinking agent (DICNALHX manufactured by DIC Corporation) used in Example 5.

Example 8

A sheet according to Example 8 was made in the same manner as in Example 5 except that the resin composition was not foamed but applied to the base material as it was in Example 5.

Example 9

Two sheets according to Example 7 were prepared. Self adhesion strength of the self-adhesive layers adhering to each other, and the concentration of formaldehyde when the sheets were put in the tedlar bag were measured.

Example 10

A sheet according to Example 10 was made in the same manner as in Example 1 except using a melamine crosslinking agent (BECKAMINE M3 manufactured by DIC Corporation) and a crosslinking promoter (CATALYST ACX manufactured by DIC Corporation) instead of the carbodiimide crosslinking agent (DICNAL HX manufactured by DIC Corporation) used in Example 1.

Example 11

A sheet according to Example 11 was made in the same manner as in Example 1 except using carboxylic group containing acrylic acid ester copolymer resin (I') (composition: a copolymer resin of 49.0 of ethyl acrylate/42.1 of butyl acrylate/6.9 of acrylonitrile/2.0 of acrylic acid; glass transition temperature: −20.9° C., and gel fraction: 89.6%) instead of the N-methylol group containing acrylic acid ester copolymer resin (I) used in Example 1.

Comparative Example 1

Self adhesive strength was measured, and cohesive peeling was evaluated on aluminum adhesion tape (8600-20-50X50 manufactured by SLIONTEC Devision).

Comparative Example 2

Self adhesive strength was measured, and cohesive peeling was evaluated on Bond/GP Clear (#14372 manufactured by Konishi Co., Ltd.).

TABLE 1

| | | Ex. 1 | Ex. 2 | Ex. 3 | Ex. 4 | Ex. 5 | Ex. 6 | Ex. 7 |
|---|---|---|---|---|---|---|---|---|
| (Meth)acrylic Acid Ester Copolymer Resin | (I) | 100 | 100 | | | | | |
| | (II) | | | | | | | |
| | (III) | | | 100 | | | | |
| | (IV) | | | | 100 | | | |
| | (V) | | | | | 100 | | 100 |
| | (I') | | | | | | 100 | |
| | (II') | | | | | | | |
| Cross-linking Agent | DICNAL HX | 3.6 | | 3.6 | 3.6 | 3.6 | 3.6 | |
| | CARBODILITE E-02 | | 3.6 | | | | | 2.2 |
| | BECKAMINE M-3 | | | | | | | |
| Cross-linking Promoter | CATALYST ACX | | | | | | | |
| Pigment | DISPERSE WHITE HG-701 | 4.2 | 4.2 | 4.2 | 4.2 | 4.2 | 4.2 | 4.2 |
| Thickener | ARON B-300K | 2.0 | 2.0 | 2.0 | 2.0 | 2.0 | 2.0 | 2.0 |
| Foam Stabilizer | DICNAL M-20 | 2.2 | 2.2 | 2.2 | 2.2 | 2.2 | 2.2 | 2.2 |
| | DICNAL M-40 | 1.9 | 1.9 | 1.9 | 1.9 | 1.9 | 1.9 | 1.9 |
| Material Properties | Foaming Magnification | 2 | 2 | 2 | 2 | 2 | 2 | 1.6 |
| | Cross-linking Agent Type | carbodiimide | carbodiimide | carbodiimide | carbodiimide | carbodiimide | carbodiimide | carbodiimide |
| | Resin Tg (DSC) | −25.9° C. | −25.9° C. | −17.6° C. | −10.1° C. | −15.3° C. | −22.8° C. | −15.3° C. |
| | Gel Fraction of Resin (insoluble of ethyl acetate) | 43.1% | 43.1% | 28.0% | 42.2% | 41.5% | 60.5% | 41.5% |
| Evaluation Category | Self Adhesion Strength (for paper) | 0.44 | 0.45 | 0.42 | 0.23 | 0.39 | 0.26 | 0.46 |
| | Self Adhesion Strength (for layers each other) | — | — | — | — | — | — | — |

TABLE 1-continued

| | | | | | | | | |
|---|---|---|---|---|---|---|---|---|
| | Cohesion Peeling | good | good | good | good | good | good | good |
| | Formaldehyde Dissipation Evaluation (good: 0.2 ppm or below) | good | good | good | good | good | good | good |
| | Layer Strength (N/cm) | 6.3 | 6.5 | 6 | 6.3 | 6 | 6.2 | 5.1 |
| | Glossiness (gloss at 60°) Excellent if 35 or over | 44.2 | 38.6 | 39.9 | 36.3 | 38.5 | 46.1 | 45.3 |

| | | Ex. 8 | Ex. 9 | Ex. 10 | Ex. 11 | Comp. Ex. 1 | Comp. Ex. 2 |
|---|---|---|---|---|---|---|---|
| (Meth)acrylic Acid Ester Copolymer Resin | (I) | | | | 100 | Aluminum Adhesive Tape (8600-20-50X50 by SLIONTEC) | Bond/GP Clear (#14372 by Konishi) |
| | (II) | | | | | | |
| | (III) | | | | | | |
| | (IV) | 100 | 100 | | | | |
| | (V) | | | | | | |
| | (I') | | | | 100 | | |
| | (II') | | | | | | |
| Cross-linking Agent | DICNAL HX | | | | 3.6 | | |
| | CARBODILITE E-02 | 2.2 | 2.2 | | | | |
| | BECKAMINE M-3 | | | 7.3 | | | |
| Cross-linking Promoter | CATALYST ACX | | | 0.3 | | | |
| Pigment | DISPERSE WHITE HG-701 | 4.2 | 4.2 | 4.2 | 4.2 | | |
| Thickener | ARON B-300K | 2.0 | 2.0 | 1.6 | 2.0 | | |
| Foam Stabilizer | DICNAL M-20 | 2.2 | 2.2 | 2.2 | 2.2 | | |
| | DICNAL M-40 | 1.9 | 1.9 | 1.9 | 1.9 | | |
| Material Properties | Foaming Magnification | 1 | 1.6 | 2 | 2 | | |
| | Cross-linking Agent Type | carbodiimide | carbodiimide | melamine | carbodiimide | | |
| | Resin Tg (DSC) | −15.3° C. | −15.3° C. | −25.9° C. | −20.9° C. | | |
| | Gel Fraction of Resin (insoluble of ethyl acetate) | 41.5% | 41.5% | 43.1% | 89.6% | | |
| Evaluation Category | Self Adhesion Strength (for paper) | 0.07 | — | 0.06 | 0.16 | 3.32 | 8.72 |
| | Self Adhesion Strength (for layers each other) | — | 2.17 | — | — | — | — |
| | Cohesion Peeling | good | good | good | good | good | bad |
| | Formaldehyde Dissipation Evaluation (good: 0.2 ppm or below) | good | good | bad | good | — | — |
| | Layer Strength (N/cm) | 2.5 | 5.1 | 4 | 4.5 | — | — |
| | Glossiness (gloss at 60°) Excellent if 35 or over | 18.0 | 45.3 | 45.6 | 32.7 | — | — |

As shown in Table 1, all the sheets according to Examples 1 to 11 had low dissipation of formaldehyde, and repeating adhesion. That is, it can be said that the package including the self-adhesive layer (self-adhesive) according to any Examples 1 to 11 is repeatedly sealable after opened first time. On the other hand, self adhesion strength was too much in Comparative Examples 1 and 2, and cohering object was confirmed in Comparative Example 2, which led to inferior repeating adhesion.

REFERENCE SIGNS LIST

1, 11 space
2, 12, 22, 32 opening
3, 13, 23, 33 self-adhesive
4, 14, 24 package body
5, 15, 25 lid
6, 16, 26 upper edge
7 collar
18 wrapping film
10, 20, 30, 40, 50, 60, 80, 90, 100 package

The invention claimed is:

1. A method for producing a self-adhesive to be arranged on a package comprising a space to store contents and an opening by which the space and an outside communicate, wherein the opening is repeatedly openable and sealable by the self-adhesive that consists of a cross-linking material of a resin composition containing a (meth)acrylic acid ester copolymer resin having a glass transition temperature of −22.8° C. or more, and a crosslinking agent, the method comprising:
    making the resin composition that contains the (meth)acrylic acid ester copolymer resin, and the crosslinking agent, the resin composition being either emulsion or dispersion, and the emulsion or dispersion having a viscosity of 3,500 to 5,500 mPa·s; and
    cross-linking the resin composition.

2. The method for producing a self-adhesive according to claim 1, wherein said cross-linking is carried out on a surface of the package.

3. The method for producing a self-adhesive according to claim 1, wherein said self-adhesive has a thickness of 0.03 mm to 3 mm.

4. The method for producing a self-adhesive according to claim 1, wherein said self-adhesive has a density of 0.1 g/cm³ to 1.0 g/cm³.

5. The method for producing a self-adhesive according to claim 1, wherein the viscosity is measured at ambient temperature.

6. A method for producing a self-adhesive to be arranged on a package comprising a space to store contents and an opening by which the space and an outside communicate, wherein the opening is repeatedly openable and sealable by the self-adhesive that consists of a cross-linking material of a resin composition containing a (meth)acrylic acid ester copolymer resin having a glass transition temperature of −22.8° C. or more, and a crosslinking agent, the resin composition being a resin composition foam, the method comprising:

making the resin composition that contains the (meth) acrylic acid ester copolymer resin, and the crosslinking agent, the resin composition being either emulsion or dispersion, and the emulsion or dispersion having a viscosity of 3,500 to 5,500 mPa·s;

foaming the resin composition, to make the resin composition foam; and cross-linking the resin composition foam.

7. The method for producing a self-adhesive according to claim 6, wherein said cross-linking is carried out on a surface of the package.

8. The method for producing a self-adhesive according to claim 6, wherein said self-adhesive has a thickness of 0.03 mm to 3 mm.

9. The method for producing a self-adhesive according to claim 6, wherein said self-adhesive has a density of 0.1 g/cm$^3$ to 1.0 g/cm$^3$.

10. The method for producing a self-adhesive according to claim 6, wherein the viscosity is measured at ambient temperature.

\* \* \* \* \*